C. F. SMITH.
AUTOMATIC PACKING MACHINE.
APPLICATION FILED JULY 13, 1912.

1,293,625.

Patented Feb. 4, 1919.
17 SHEETS—SHEET 2.

WITNESSES

INVENTOR
Charles F. Smith
BY
A. Alexander Thomas
ATTORNEY

C. F. SMITH.
AUTOMATIC PACKING MACHINE.
APPLICATION FILED JULY 13, 1912.

1,293,625.

Patented Feb. 4, 1919.
17 SHEETS—SHEET 3.

WITNESSES

INVENTOR
Charles F. Smith
BY
A. Alexander Thomas
ATTORNEY

C. F. SMITH.
AUTOMATIC PACKING MACHINE.
APPLICATION FILED JULY 13, 1912.

1,293,625.

Patented Feb. 4, 1919.
17 SHEETS—SHEET 6.

WITNESSES

INVENTOR
Charles F. Smith
BY
A. Alexander Thomas
ATTORNEY

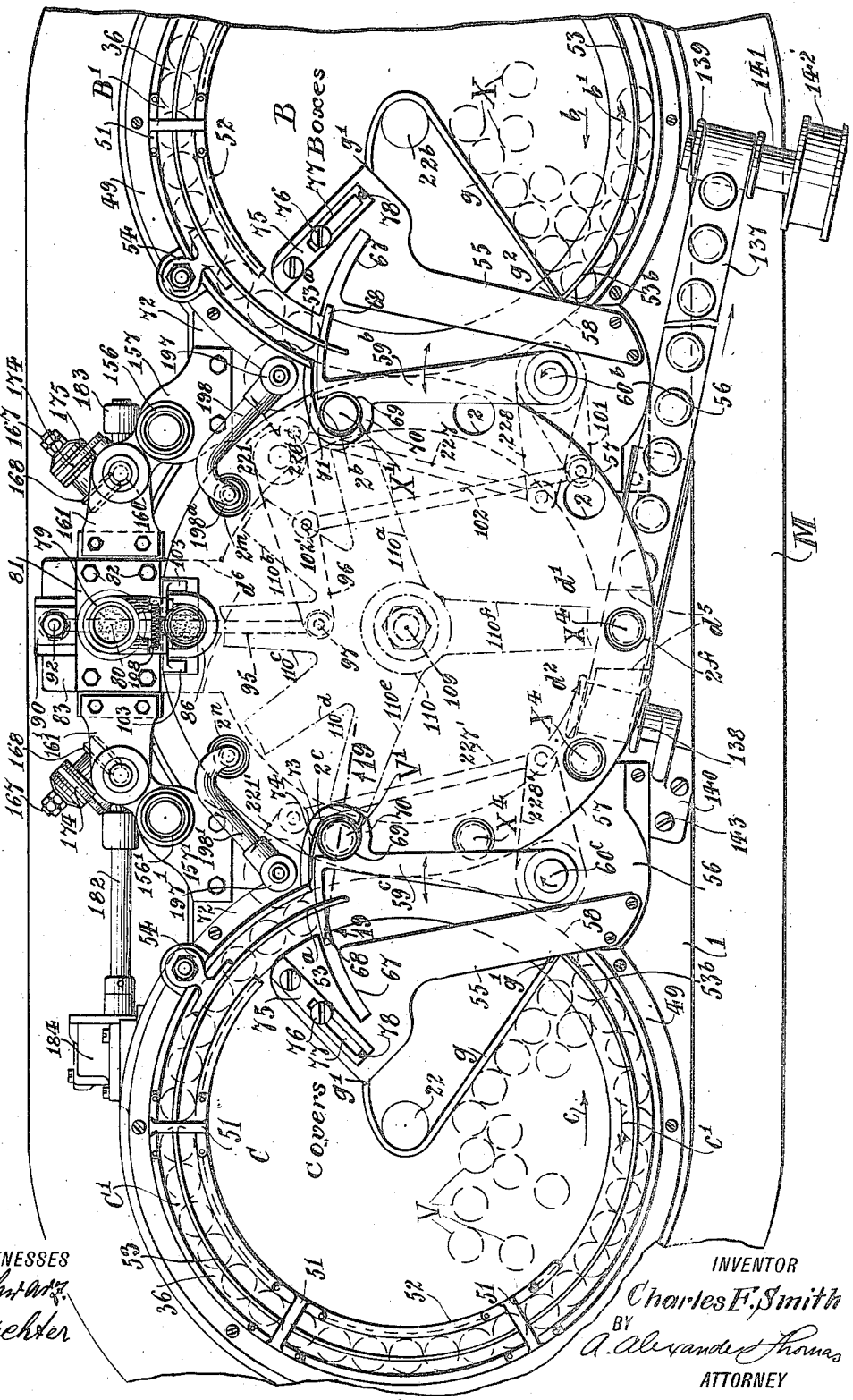

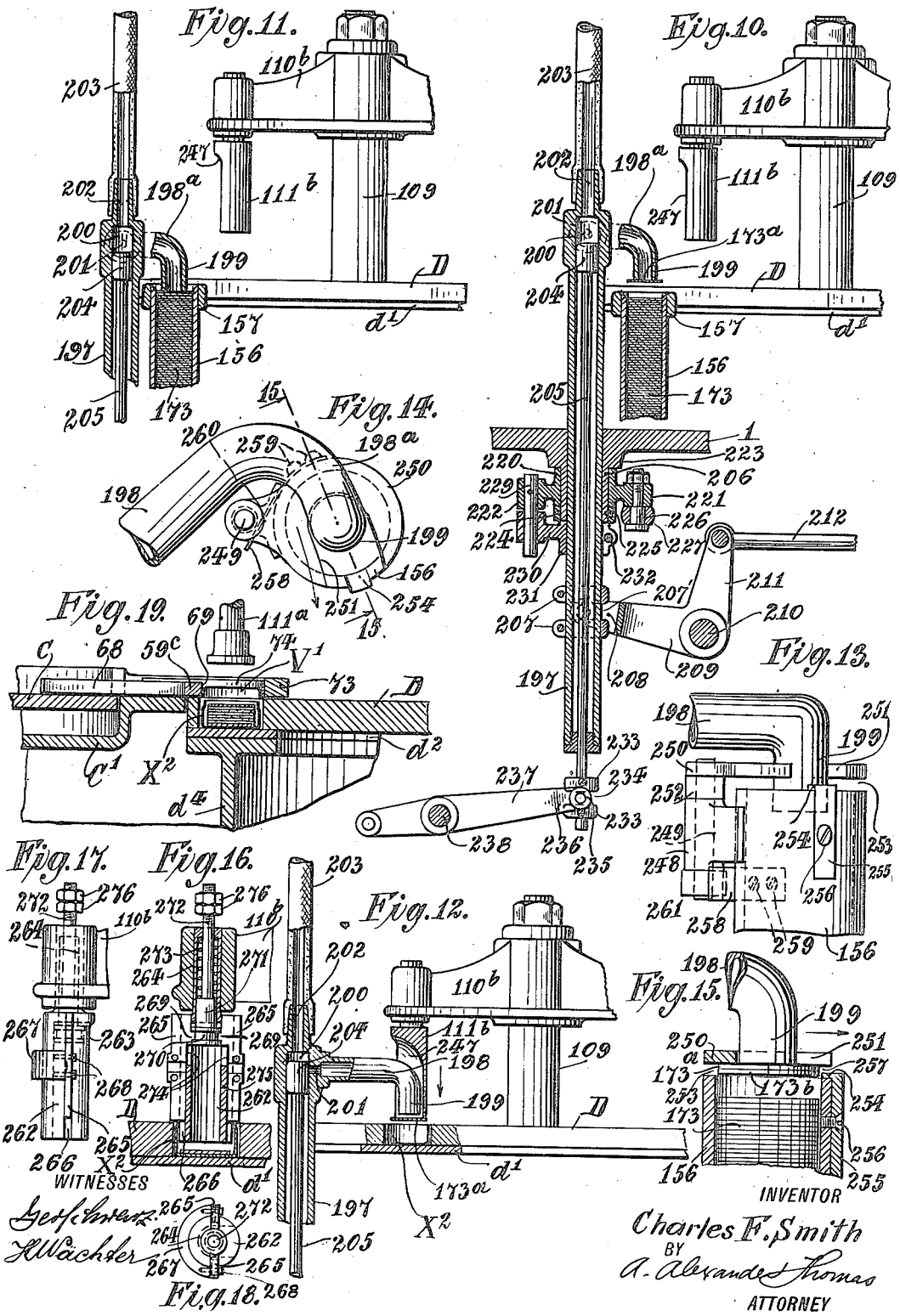

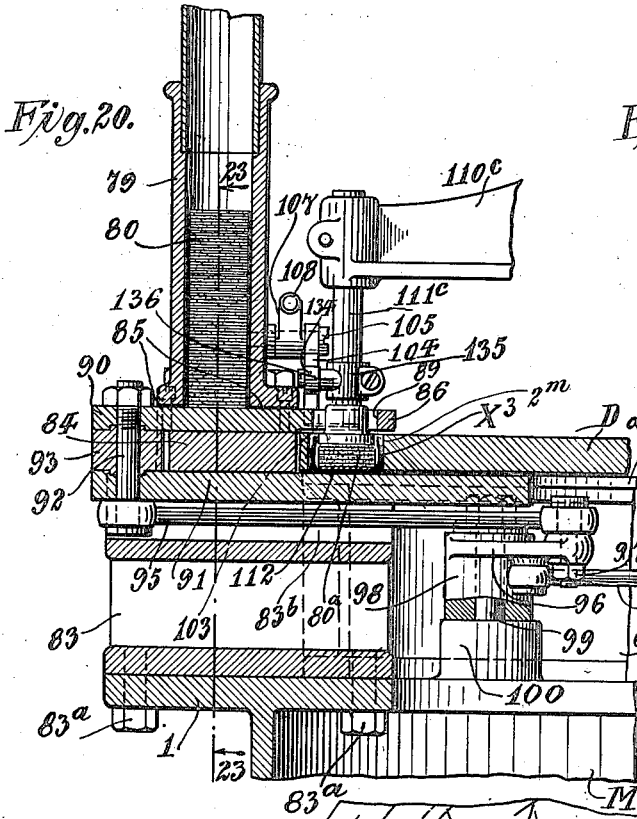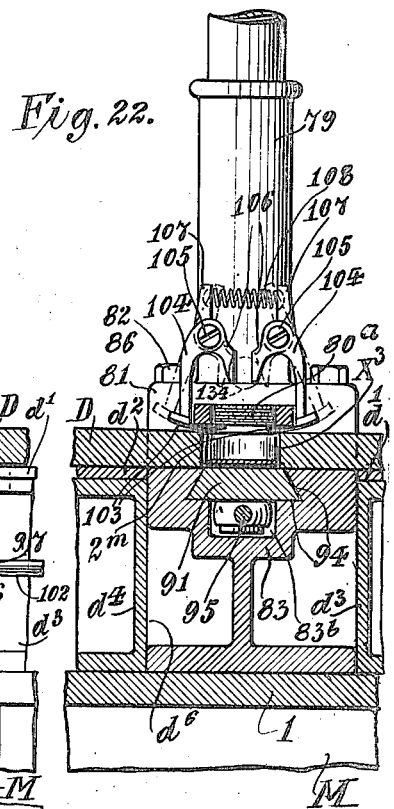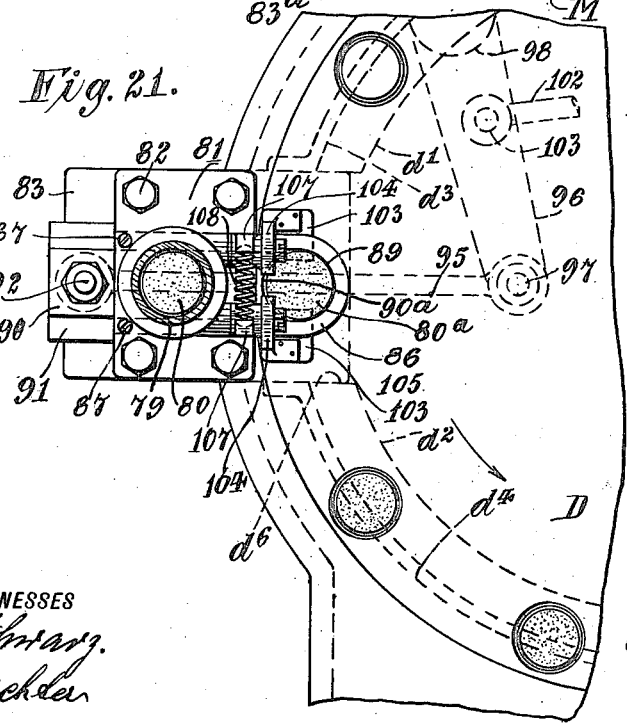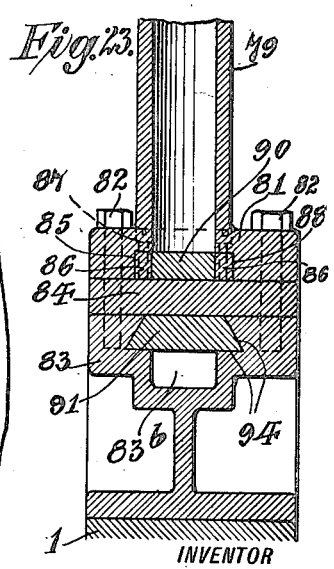

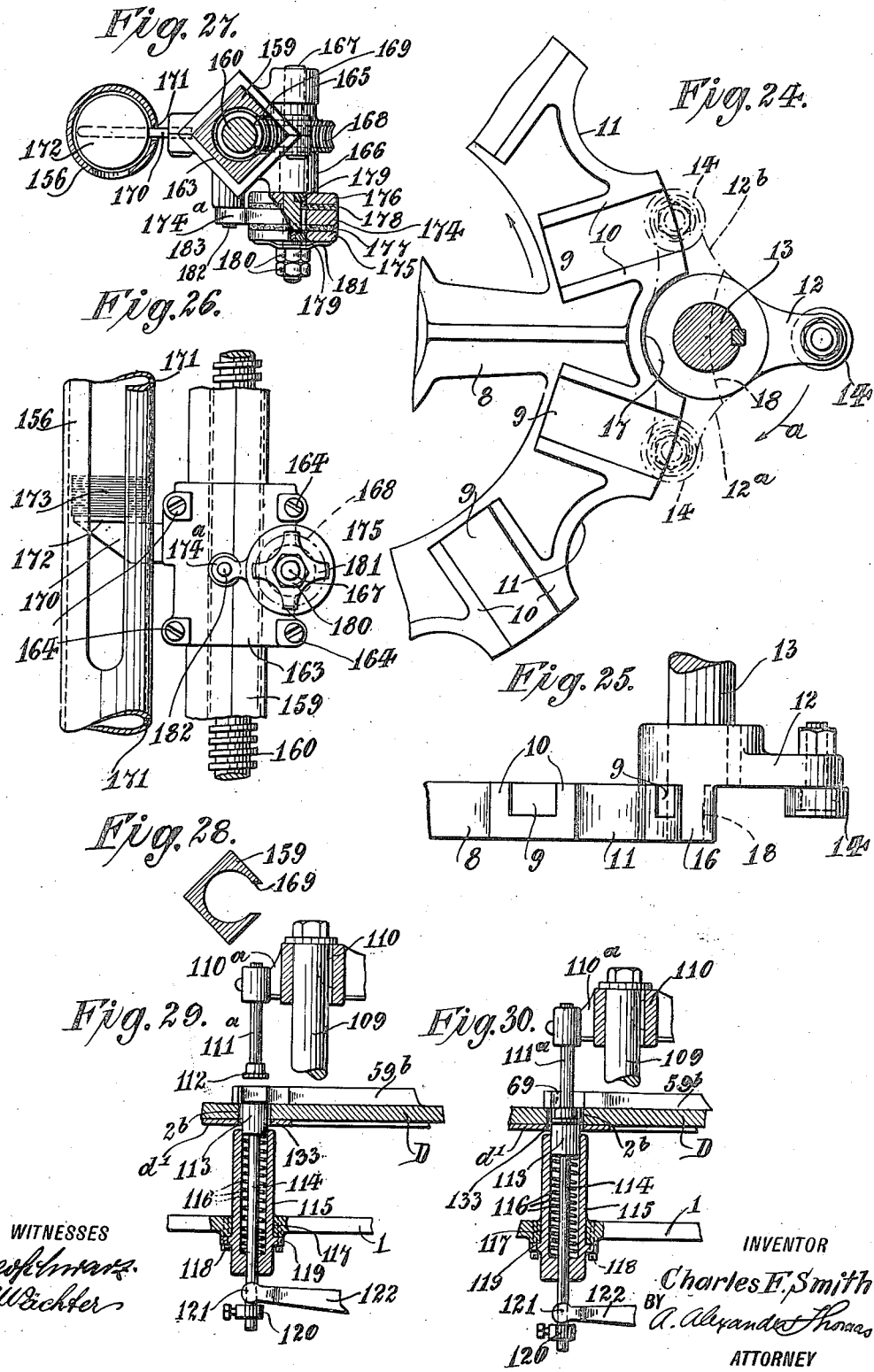

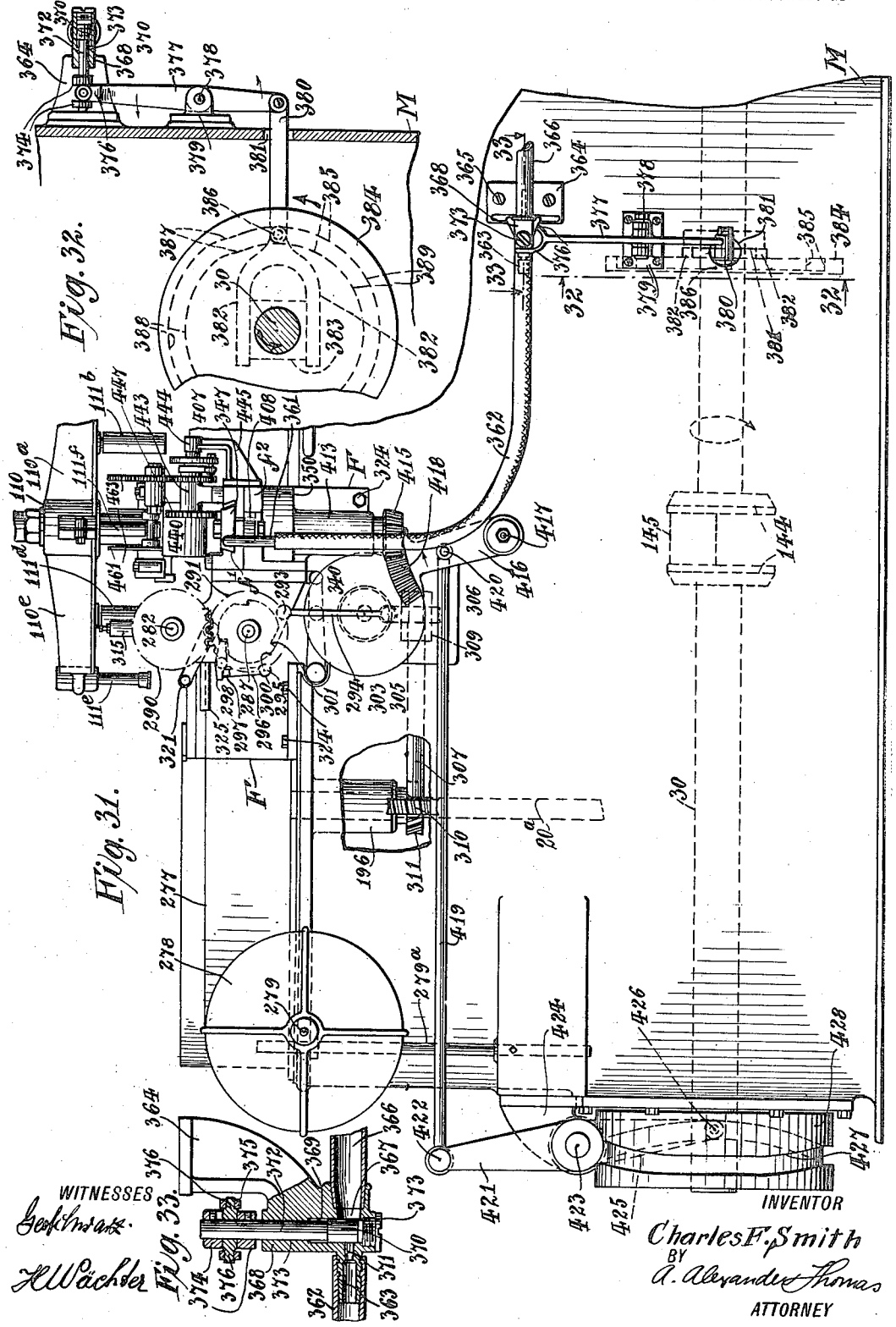

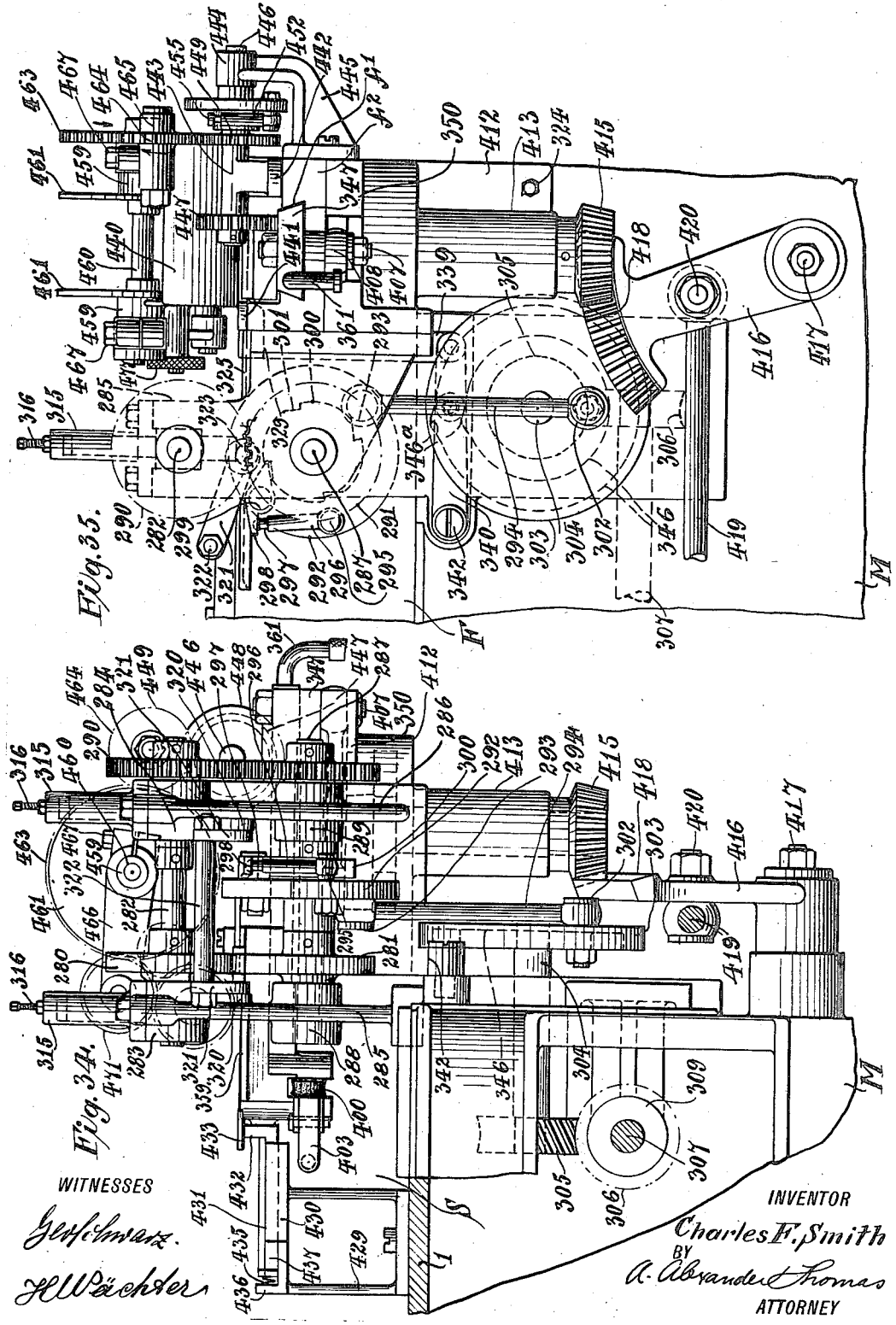

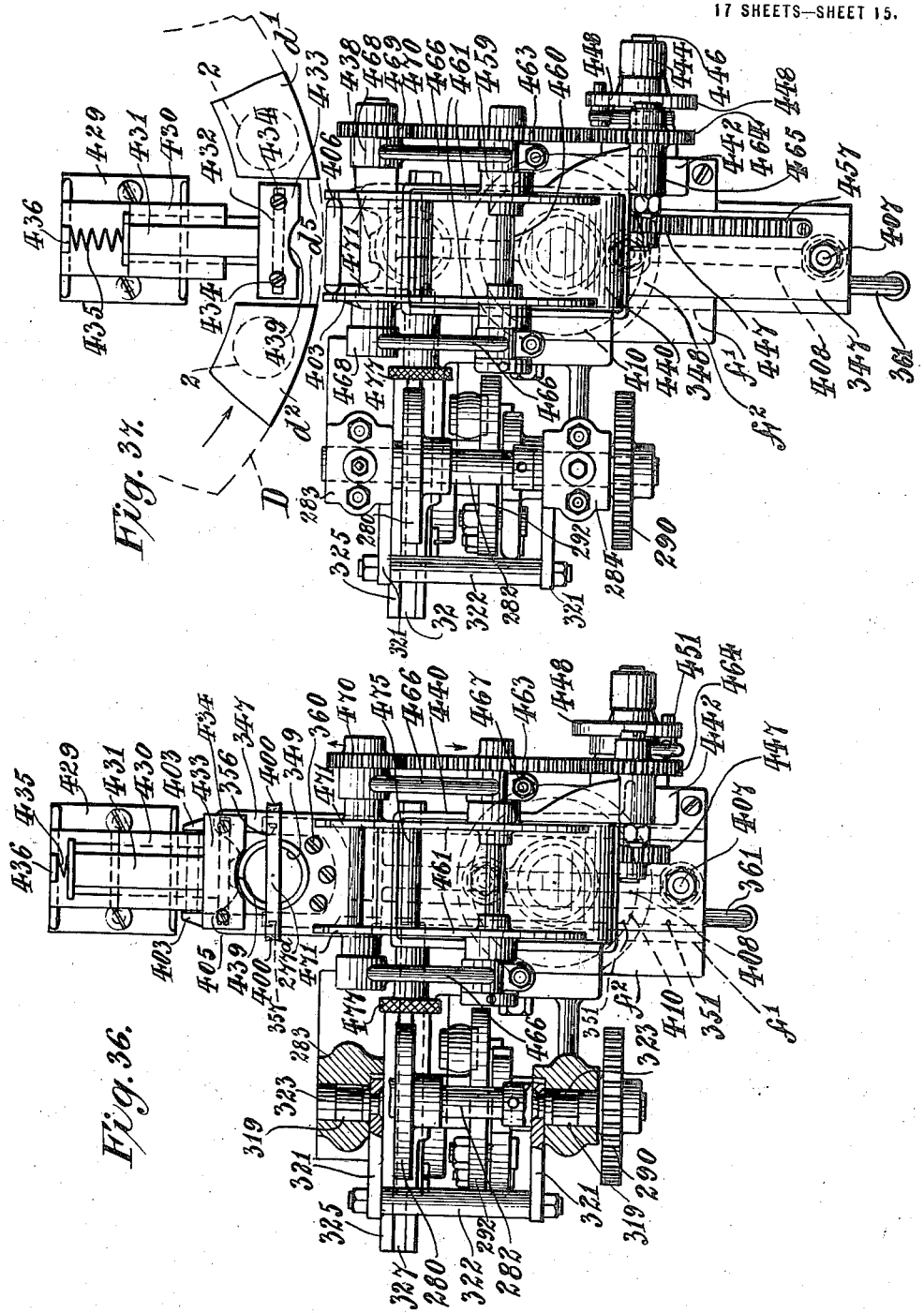

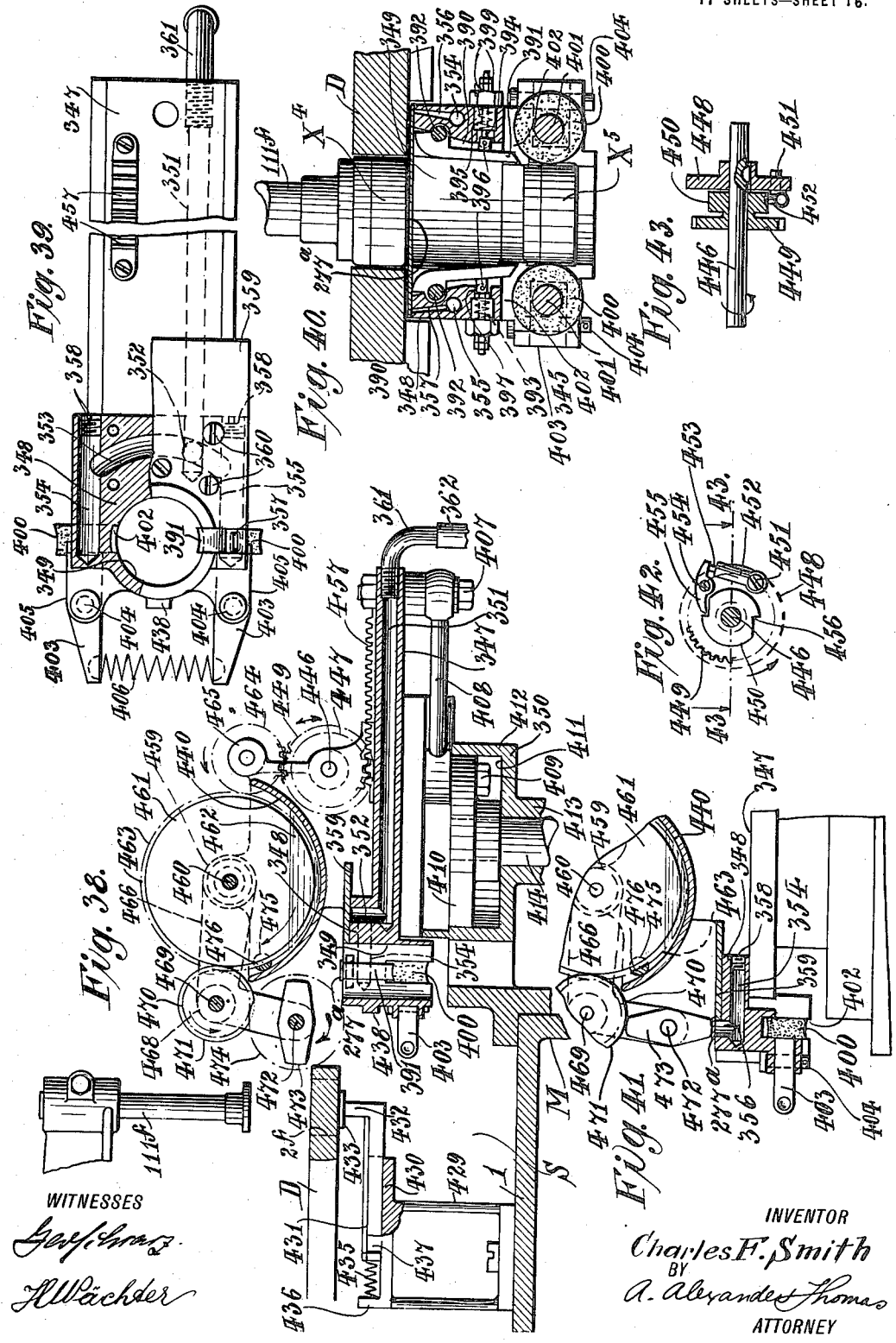

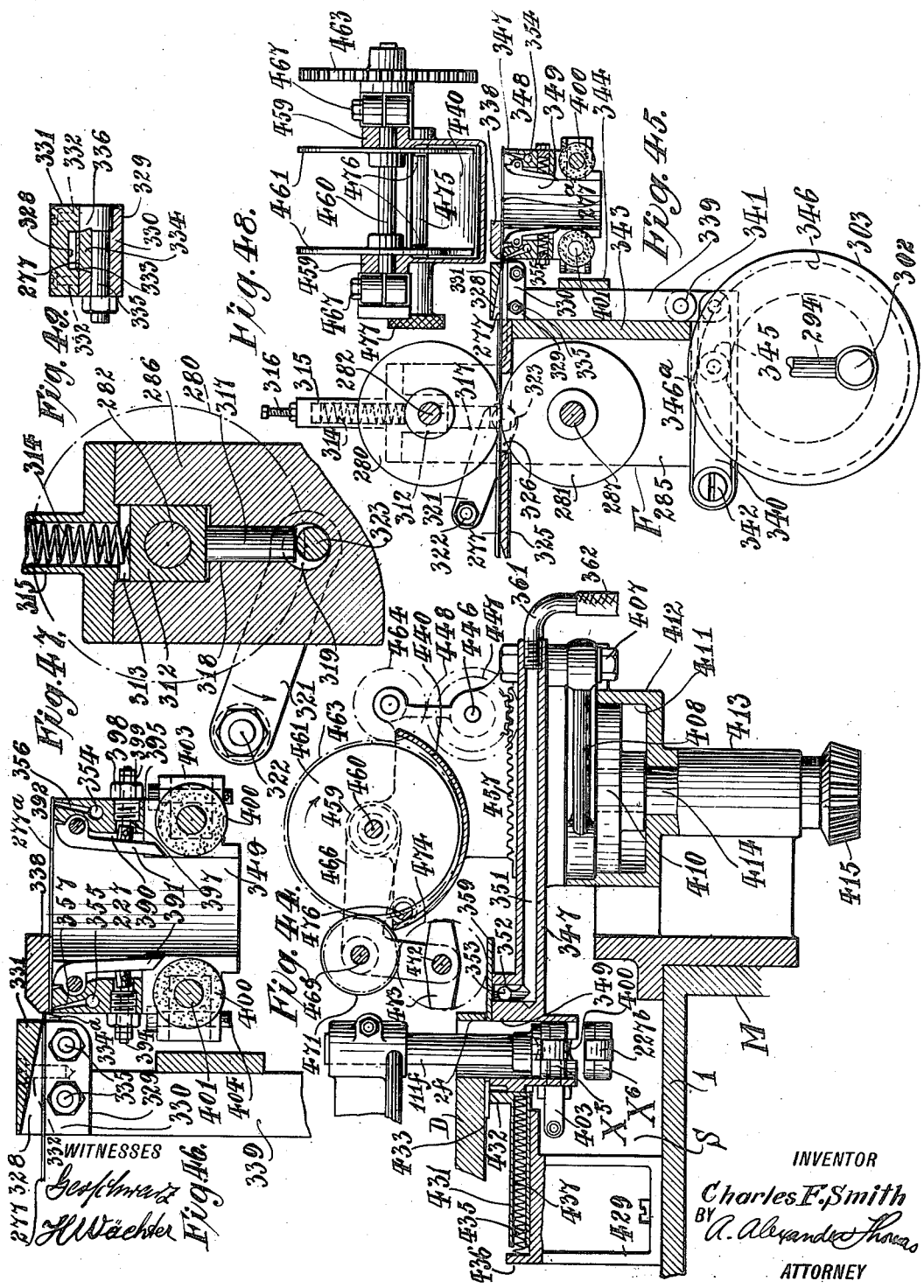

UNITED STATES PATENT OFFICE.

CHARLES F. SMITH, OF DEXTER, NEW YORK, ASSIGNOR, BY MESNE ASSIGNMENTS, TO AUTOSALES CORPORATION, A CORPORATION OF NEW YORK.

AUTOMATIC PACKING-MACHINE.

1,293,625.   Specification of Letters Patent.   Patented Feb. 4, 1919.

Application filed July 13, 1912. Serial No. 709,143.

*To all whom it may concern:*

Be it known that I, CHARLES F. SMITH, a citizen of the United States, and residing at Dexter, county of Jefferson, State of New York, have invented certain new and useful Improvements in Automatic Packing-Machines, of which the following is a specification.

My invention relates to automatic packing machines and has for its general object the provision of a machine which will automatically pack small boxes with suitable material in the form of chips. These chips may be chewing-gum, candy, compressed tobacco, soap, etc.

In its general construction, the machine of my invention includes a rotatable assembling dial, with a box-feeding mechanism at one side and a cover - feeding mechanism at the other. To one side of the dial, substantially midway between the two feeding mechanisms, is arranged a material-feeding mechanism. In the preferred form of my invention the box and cover-feeding mechanisms include a pair of oppositely-rotatable disks. These disks are mounted concentrically and are so arranged that the boxes or covers are thrown centrifugally from the inner to the outer disks, from which they are delivered to the assembling dial. The empty boxes on the dial are packed with the requisite quantity of material and the covers are automatically placed upon the packed boxes. In its preferred embodiment, my new and improved packing machine includes an automatic banding mechanism associated with the dial opposite the material-feeding mechanism. When a sealed box is discharged from the dial it is automatically fed into the banding mechanism where a band of paper or suitable material is automatically applied to the bottom and the sides of the sealed box. Of course, if desired, the banding mechanism may be omitted and the sealed boxes delivered from the dial to a suitable conveyer belt. Over the assembling dial operates a plunger mechanism which insures the proper position of the empty boxes on the dial, insures the feeding of the material into the empty box, forces the covers onto the packed boxes, and discharges the sealed boxes from the dial. In the specific construction shown in the drawings, the various operating parts derive their motion from a main driving shaft journaled in the lower portion of the machine bed, and these connections are such as to harmonize the movements of the operating parts.

My invention also includes the provision of means for automatically feeding suitable blanks or patches into the boxes—one blank being fed into the box before the material is deposited therein, and the other blank being fed on top of the material in the box. These blanks or patches may be of suitable material to act as a protection for the contents of the box; or, the top blank may be for advertising purposes. Where such blanks are not desired, the blank feeding mechanisms may be omitted or disconnected from the operating shaft.

The various characteristics and advantages of my new packing machine will become apparent from a detailed description of the accompanying drawings which show a preferred embodiment of my invention, and in which—

Fig. 9 is a top plan view, partly broken away, showing the movable parts associated with the assembling dial in operated position;

Fig. 10 is a detached view showing one of the blank feeding mechanisms, the feeding arm being shown in elevated position over the associated magazine;

Fig. 11 is a view similar to Fig. 10 showing the feeding arm in position to pick up a blank;

Fig. 12 shows a view similar to Fig. 10 with the feeding arm over an empty box on the dial and the plunger mechanism on the dial in the act of stripping the blank from the feeding arm and carrying the same into the box;

Fig. 13 is a detached detail view showing stripping means arranged at the top of the blank feeding magazine for positively preventing more than one blank attaching to the feeding arm as it leaves the magazine;

Fig. 14 is a plan view of Fig. 13;

Fig. 15 shows a cross section on line 15—15 of Fig. 14;

Fig. 16 is a detached detail view showing one of the plungers on the plunger mechanism provided with a box stripping attachment to strip from the plunger any box that might accidentally attach to it as it rises out of the empty box on the dial;

Fig. 17 is a side view of the plunger shown in Fig. 16;

Fig. 18 is a plan view of Fig. 17;

Fig. 19 is a detached detail view taken on the sectional line 19—19 of Fig. 9 to show how the cover is held centralized over the packed box on the dial;

Fig. 20 is a cross-sectional view showing details of the material-feeding mechanism;

Fig. 21 is a plan view of Fig. 20;

Fig. 22 is a front view, partly in cross-section, of the material-feeding mechanism;

Fig. 23 is a vertical cross-sectional view substantially on line 23—23 of Fig. 20;

Fig. 24 is a fragmentary view in plan showing how the star-wheel connected with the assembling-dial is intermittently operated by the associated crank arm, which receives continuous motion from the main driving shaft;

Fig. 25 is a side view of what is shown in Fig. 24;

Fig. 26 is a fragmentary view in side elevation showing a portion of the blank feeding mechanism;

Fig. 27 is a plan-view of Fig. 26;

Fig. 28 is a cross-sectional view in plan of the guide surrounding the screw shaft shown in Figs. 26 and 27;

Fig. 29 is a fragmentary view partly in cross-section of the box-supporting plug arranged beneath the assembling-dial, the plug being shown in elevated position;

Fig. 30 is a view similar to Fig. 29 showing the plug in depressed position;

Fig. 31 represents a side elevation of my machine, showing the banding mechanism and certain operative connections leading from the main driving shaft;

Fig. 32 is a fragmentary detail view on line 32—32 of Fig. 31 showing the connections for controlling the exhaust valve associated with the banding mechanism;

Fig. 33 is a cross-sectional view in plan taken substantially on line 33—33 of Fig. 31 showing certain details of the air valve for the banding mechanism;

Fig. 34 shows a side view of the banding mechanism, on an enlarged scale;

Fig. 35 is a front view of Fig. 34, looking from right to left;

Fig. 36 is a plan view of the banding mechanism showing the band carrier slide in operated position;

Fig. 37 is a view similar to Fig. 36 showing the slide in withdrawn position;

Fig. 38 is a fragmentary view in transverse cross-section showing portions of the banding mechanism and the assembling dial;

Fig. 39 is a detached view in plan, partly in cross-section, of the band carrier slide;

Fig. 40 is a fragmentary cross-sectional view showing how the sealed boxes are forced into the band carrier slide to have a paper band automatically applied thereto;

Fig. 41 is a fragmentary view of the banding mechanism showing how the paste wheels operate to automatically apply a suitable adhesive to the ends of the paper band;

Fig. 42 is a detached view showing a wheel and ratchet connection to prevent reverse rotation of the paste wheels during the return movement of the band carrier slide;

Fig. 43 is a cross-section on line 43—43 of Fig. 42;

Fig. 44 shows how the discharging plunger on the plunger mechanism forces the sealed boxes into the banding mechanism;

Fig. 45 is a fragmentary view of the banding mechanism showing mainly the feeding wheels and the cutting knife which is automatically operated to cut the paper into bands of predetermined length from a continuous roll;

Fig. 46 is an enlarged view of a portion of Fig. 45, showing the cutting mechanism in elevated or cutting position;

Fig. 47 is a fragmentary detail view in cross-section showing the adjustable mounting of the upper feed roll;

Fig. 48 is a detached view of the paste pan and connected parts; and

Fig. 49 is a detached detail view in cross-section showing the mounting of the knife in the holder of the cutting mechanism.

The various parts which go to make up the different mechanisms of my machine are mounted on a suitable framework or machine bed indicated as a whole by M. As seen from Fig. 1, the general contour of this framework is rectangular with rounded ends. Centrally arranged over the top plate 1 of the machine bed M is the assembling dial D. To one side of this dial is the box-feeding mechanism and to the other side the cover-feeding mechanism. The function of the assembling dial is to receive the empty boxes and carry them from the point at which the box-feeding mechanism delivers them, to the material-feeding mechanism, thence to the cover-feeding mechanism, and thence to a point of discharge from the dial either directly to a conveying belt or into the banding mechanism.

To give as clear and concise a detail description as possible of my new packing machine, the main mechanisms and connections which it includes will be considered separately under different headings.

Figure 4:
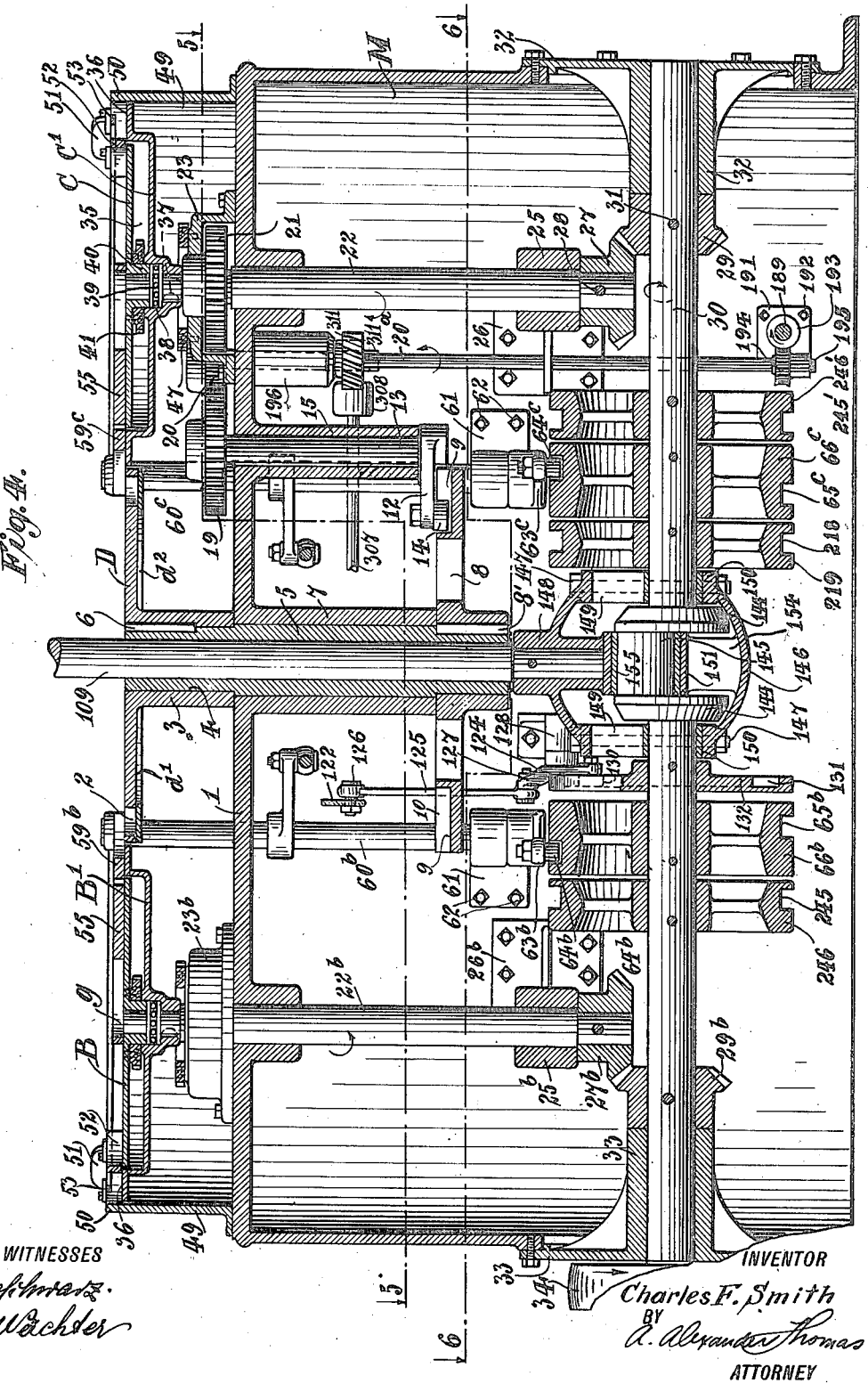
Fig. 4 is a central longitudinal cross-section on line 4—4 of Fig. 1.
Figure 5:
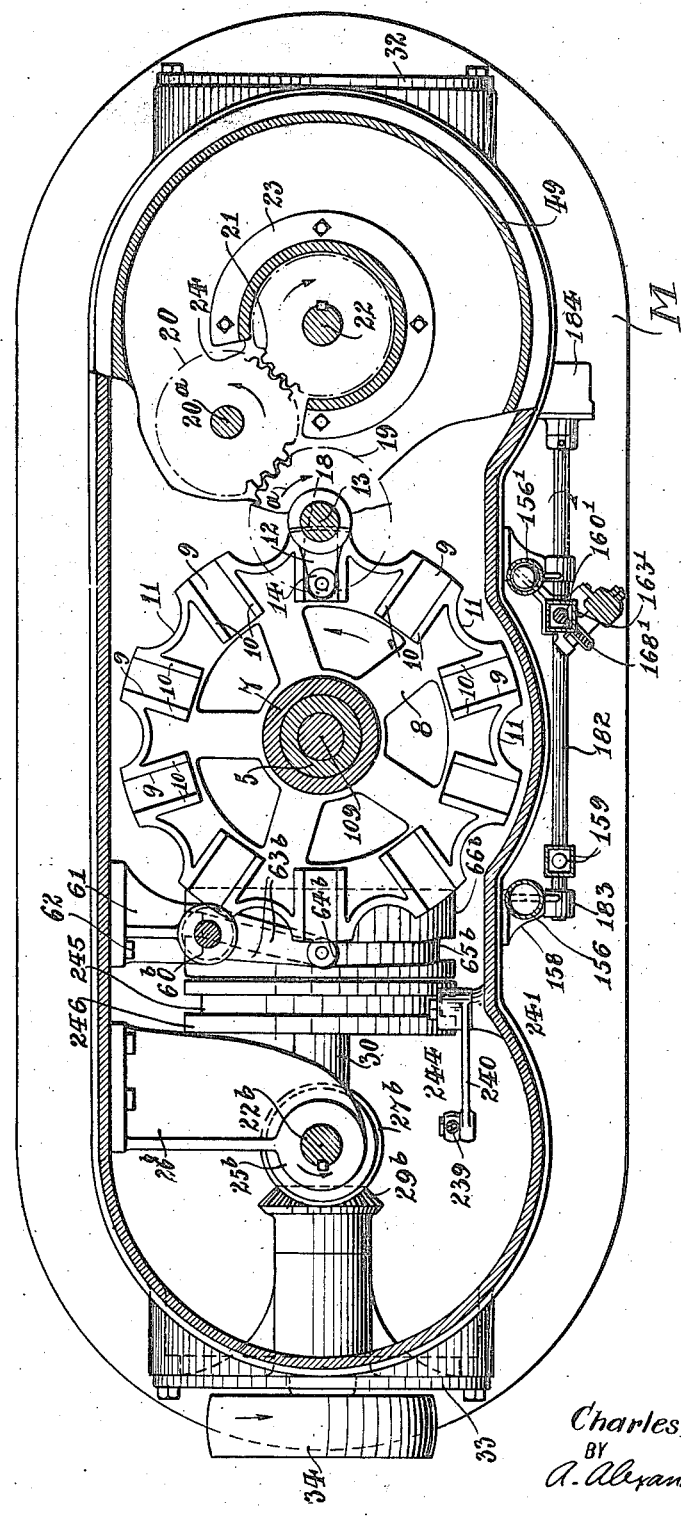
Fig. 5 is a cross-sectional view in plan taken substantially on the broken line 5—5 of Fig. 4.

*Assembling dial and connections.*—The assembling dial D is a heavy metallic disk provided with a series of openings or pockets 2 adapted to receive the boxes for packing. These openings are spaced apart at equal distances around the periphery of the dial. In the particular design of machine shown in the drawings, the dial is provided with ten openings. Underneath the openings of the dial is arranged a pair of arc-shaped plates $d^1$ and $d^2$, as indicated in dotted lines in Figs. 1 and 9, for supporting the boxes in the openings 2. These supporting plates are carried on the top of suitable brackets $d^3$ and $d^4$, respectively, as shown in Figs. 19, 21 and 22. The brackets $d^3$ and $d^4$, which follow the curvature of the plates $d^1$ and $d^2$, are rigidly mounted on the top plate 1 of the machine bed. At one end, the box-supporting plates $d^1$ and $d^2$ and their brackets, are separated by the space $d^5$, while at the other end they are separated by the space $d^6$. As will be explained later on, the space $d^5$ is provided for the discharge of the sealed boxes, while the space $d^6$ is for the purpose of accommodating certain parts of the material-feeding mechanism, to be subsequently referred to in detail. The dial has formed thereon a downwardly-extending bushing or hub 3 adapted to rest on the top 1 of the machine bed. The hub 3 has an opening 4 into which extends the upper portion of the sleeve 5. The dial D is rigidly connected with the sleeve 5 in any suitable manner— as by a key or spline 6. The sleeve 5 extends through the guide bushing 7 depending from the top plate of the machine bed. To the lower end of the sleeve 5 is secured the star-wheel 8 by means of the key 8', or otherwise. It will be seen that the dial and the connected parts mentioned are rotatably supported by means of the hub 3 resting on the top of the machine bed. The form of the star-wheel 8 is best shown in Fig. 5. As seen from this figure, the star-wheel is provided with a series of radial grooves or channels 9 formed by outstanding ridges or shoulders 10. There are ten of these grooves shown, to correspond with the openings 2 in the dial. Between the grooves 9 are provided peripheral recesses 11, which, as will presently appear, cause locking of the star-wheel during its intervals of rest. A crank-arm 12 is associated with the star-wheel for intermittently operating the same. The crank-arm is fixed to the lower end of a vertical counter-shaft 13, as best shown in Fig. 4, and carries at its free end a roller 14 arranged to enter the grooves 9 of the star-wheel for establishing operative connection between the two parts. The counter-shaft 13 is mounted in the bushing 15 depending from the top 1 of the machine bed, and is adapted to be continuously rotated through connections to be presently described. How the continuous rotation of the crank-arm 12 is intermittently imparted to the star-wheel 8 is perhaps best illustrated in Fig. 24, to which reference will now be had. It will be observed that the hub of the crank-arm extends downwardly at 16 into horizontal alinement with the star-wheel. This extension is rounded to form a locking surface 17 adapted to extend into the recesses 11 during the time that the roller 14 is out of engagement with the grooves 9 of the star-wheel. It will be clear from Fig. 24 that as long as the locking extension 16 projects into one of the recesses 11, the star-wheel is positively locked against rotation. The curvature of the cylindrical locking surface 17 of the extension 16 corresponds with the curvature of the recess 11, so that the crank-arm may rotate freely at all times. The direction of rotation of the crank-arm is indicated by the arrow $a$ in Fig. 24. When the arm reaches the position indicated in dotted lines at $12^a$, the roller 14 comes into operative engagement with one of the grooves on the star-wheel, and rotation of the latter begins. During the time that the crank-arm moves from the position indicated at $12^a$ to the position indicated in dotted lines at $12^b$, the star-wheel is rotated one-tenth of a revolution. The extension 16 is cut away at 18, so as not to interfere with the rotation of the star-wheel. During the interval that the crank-arm rotates from position $12^b$ to position $12^a$, there is no movement of the star-wheel. Furthermore, during this interval of rest, the star-wheel is held locked against accidental rotation, as previously explained. As the assembling dial D is rigidly connected with the star-wheel, these two members always move in unison. It will be observed that I have provided a very simple and efficient means for producing intermittent rotation of the assembling dial by means of a continuously rotatable crank-arm which performs the additional function of locking the dial against movement during its intervals of rest.

Figure 3:
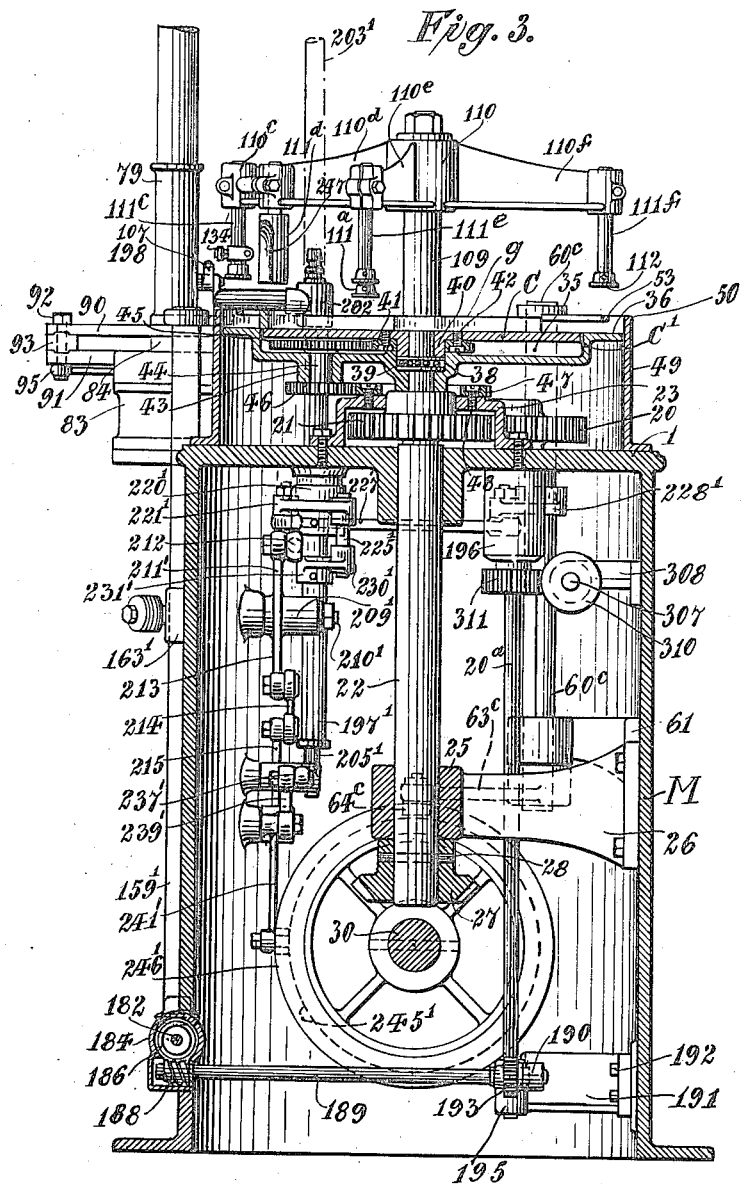
Fig. 3 is a vertical cross-section on line 3—3 of Fig. 1.

To the upper end of the counter-shaft 13 is fixed a gear 19 which is in mesh with the gear 20 fixed upon the upper end of the rotatable shaft $20^a$, as shown in Figs. 3 and 5. The gear 20 is in mesh with the gear 21 keyed upon the vertical shaft 22. As will subsequently be explained in detail, the shaft 22 supports the two disks of the cover-feeding mechanism. The shaft 22 is supported from the bracket 23 secured or bolted to the top plate of the machine bed. This bracket has an opening or cut-away portion 24 to allow engagement between the gears 20 and 21. The lower end of the shaft 22 passes through the bearing portion 25 of a bracket 26 extending from one of the side walls of the machine bed, as best shown in Fig. 3. The bevel gear 27 is secured to the lower end of the vertical shaft 22 by means of the pin 28, or in any other suitable manner, and is permanently in mesh with the bevel gear 29 secured upon the main driving shaft 30 by means of the pin 31. The shaft 30 is at its ends mounted in bearings 32 and 33 fixed in the ends of the machine bed. It is from the main driving shaft 30 that the various parts of my machine receive their proper motion. This shaft may be connected to a suitable source of power in any desired manner. For the sake of illustration I have shown a power pulley 34 secured upon one end of the shaft.

From the above description, it will be clear that the continuous rotation of the power shaft in the direction indicated by the arrow $p$ on the pulley 34, is intermittently communicated to the assembling dial D through the following connections: bevel gear 29, bevel gear 27, vertical shaft 22, gear 21, gear 20, gear 19, counter-shaft 13, crank-arm 12, star-wheel 8, sleeve 5 and connected dial D.

*Box and cover-feeding mechanisms.*—As these two feeding mechanisms are identical in construction and operation, a detailed description of one will suffice for both. For the sake of illustration, the cover-feeding mechanism will now be described in detail.

The main parts of the cover-feeding mechanism are the disks C and $C^1$. The inner disk C may conveniently be termed the separating disk, while the outer disk $C^1$ may be called the feeding disk. As best shown in Figs. 3 and 4, these disks are mounted on the upper end of the shaft 22. The feeding disk $C^1$ is provided with a recess or chamber 35 in which the separating disk C rotates. In this way the annular portion or operating surface 36 of the disk $C^1$ surrounds the disk C and lies in substantially the same plane therewith. The disk $C^1$ is rigidly connected with the shaft 22 in any suitable way, as by means of a key 37. The hub of the disk $C^1$ is provided with a recess 38 for receiving the ball bearings 39 and the lower end of the hub 40 of the disk C. In this way the disk C is rotatably mounted on the shaft 22, and is directly supported on the ball bearings 39.

Figure 1:
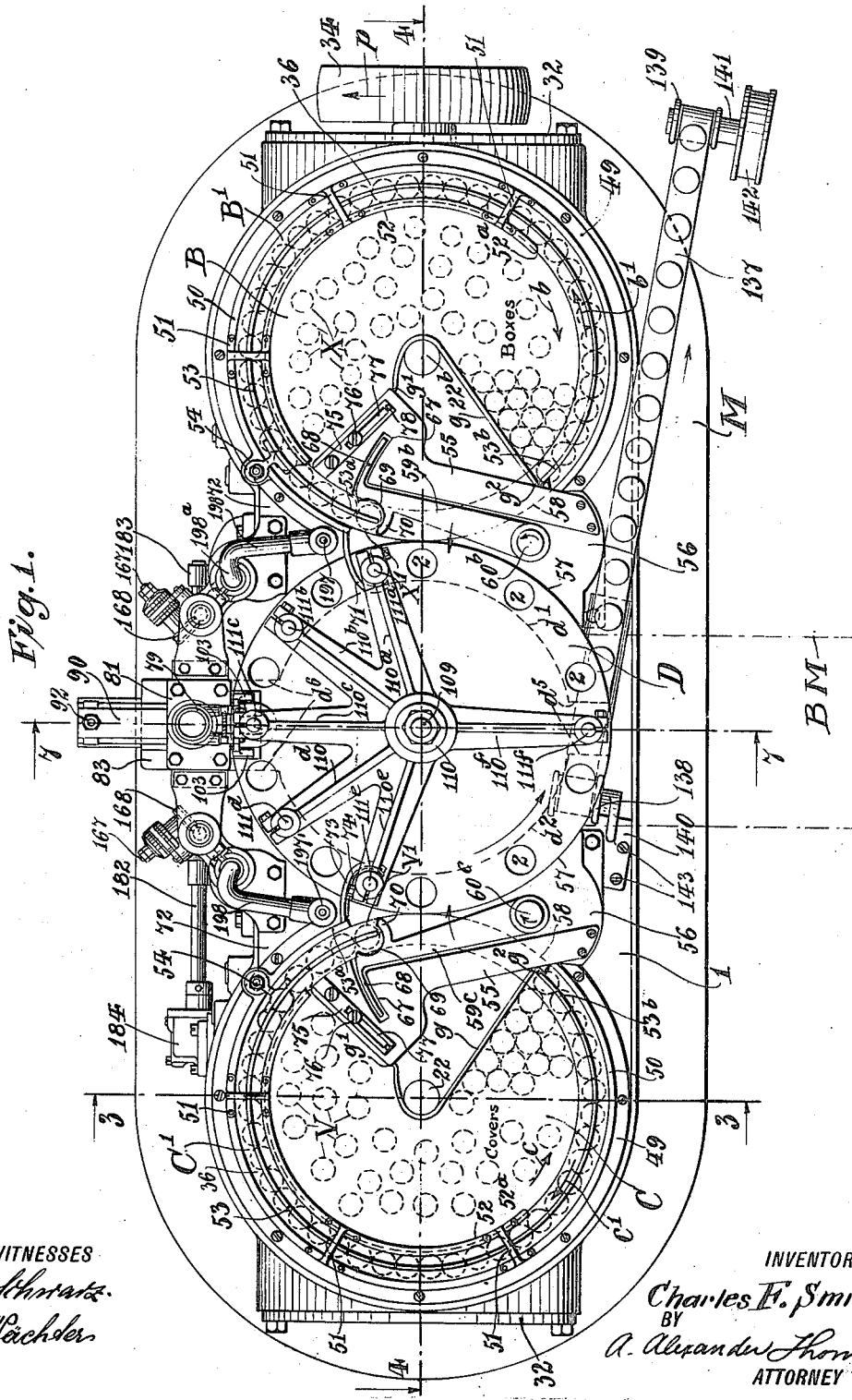
Figure 1 is a top view in plan of a packing machine constructed in accordance with my invention.

The disk C is rotated in a reverse direction to that of the shaft 22 and the disk $C^1$, through the following connections: An annular gear 41 is secured beneath the disk C by means of screws 42, or otherwise. The feeding disk $C^1$ is provided with a depending hub 43 in which is journaled the stub shaft 44. The upper end of this shaft carries the large gear 45, while the lower end carries the small gear 46. The upper gear 45 is continuously in mesh with the gear 41 on the separating disk C, while the lower gear 46 is constantly in mesh with the annular gear rack 47 rigidly mounted on top of the bracket 23 by means of screws 48. It will be clear from the above described gear connection that as the disk $C^1$ revolves with the shaft 22, the gear 46 rides around the stationary rack 47 and is thereby rotated in the same direction as the disk $C^1$, which direction is clockwise. As the gear 45 rotates in unison with the gear 46, the annular gear 41 and therefore also the separating disk C receive counter-clockwise rotation. In Figs. 1 and 9, the direction of rotation of the feeding disk $C^1$ is indicated by the arrow $c^1$, while the arrow $c$ indicates the direction of rotation of the separating disk C. In order to cause rotation of the disks C and $C^1$ at the same speed, the transmission ratio between the gear 46 and the annular rack 47 is 2:1, while the gears 45 and 41 are connected in a 1:1 ratio. The 2:1 ratio is necessary to compensate for the bodily movement of the gear 46 with the feeding disk $C^1$. It will be understood that in the broad aspect of my invention, the reverse connections of the disks C and $C^1$ with the operating shaft 22 may be established in other ways than that described.

The foregoing description of the disks C and $C^1$ and their connections with the shaft 22, applies in all its particulars to the disks B and $B^1$ of the box-feeding mechanism and their connections with the vertical shaft $22^b$. No further description regarding the disks B and $B^1$ will therefore be necessary. The lower end of the shaft $22^b$ is mounted in the vertical bearing portion $25^b$ of the vertical bracket $26^b$ which is similar to the bracket 26 associated with the shaft 22. To the lower end of the shaft $22^b$ is secured the bevel gear $27^b$ which is in mesh with the bevel gear $29^b$ rigidly mounted on the power shaft 30. The shaft $22^b$ is supported from the bracket $23^b$ fixed upon the top of the machine bed. The shaft $22^b$ has no gear which corresponds to the gear 21 on the shaft 22. As the shafts 22 and $22^b$ rotate in opposite directions the disks B and $B^1$ rotate reversely with respect to the disks C and $C^1$. Therefore, the rotation of the separating disk B is clockwise, as indicated by the arrow $b$ in Figs. 1 and 9, while the rotation of the feeding disk $B^1$ is counter-clockwise, as indicated by the arrow $b^1$.

Figure 6:
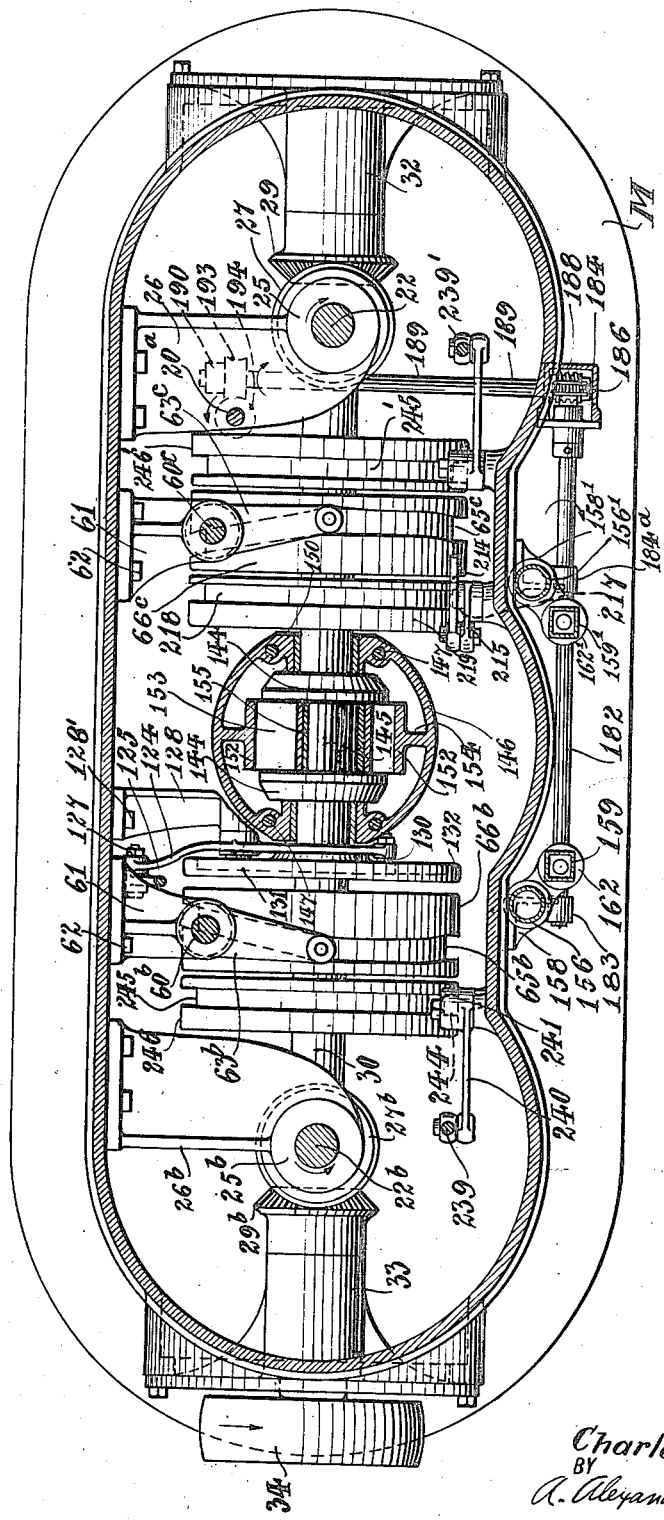
Fig. 6 is a cross-sectional view in plan taken substantially on line 6—6 of Fig. 4.

The feeding disks $B^1$ and $C^1$ are each surrounded by a cylindrical casting 49 rigidly secured to the top 1 of the machine bed A by any suitable means. As clearly seen from Fig. 4, these castings extend above the disks of the feeding mechanisms to form rims 50 which act as outer guide walls to keep the boxes and covers on their feeding disks $B^1$ and $C^1$. To the top rim of the casting 49 are secured brackets 51, three of them being shown in Fig. 1. These brackets extend radially inwardly and carry at their inner end the inner guide ring 52. This guide ring is arranged directly over the dividing line between the separating disk and the feeding disk. In this way the boxes and covers are retained on their respective feeding disks. The width of the operating surface 36 of the feeding disks is such as to accommodate the boxes or covers in a single feeding line or row, as best shown in Fig. 1 where the boxes are indicated by the dotted circles X and the covers by the dotted circles V. To prevent the boxes and covers from being accidentally pushed upwardly, I provide an upper guide-rod 53 suitably supported over the operating surface of the feeding disks $B^1$ and $C^1$, substantially midway between the inner guide-wall 52 and the outer guide-wall 50 of the casting 49. The upper guide-rod 53 may be held in position by any suitable means. In Figs. 1 and 9 is shown a bracket 54 secured at its outer end to the casting 49 and carrying at its inner end the guide-rod 53. The free end $53^a$ of the upper guide-rod 53 terminates over the foremost box or cover on the feeding-disk. At its rear end $53^b$, the guide-rod may conveniently be connected to the guide-piece 55 which is carried by the bracket 56 mounted on the top plate 1 of the machine bed. A radial guide strip $g$ is at one end secured to the guide piece 55 at the point $g^1$, and at the other end secured to the guide piece at the point $g^2$. It will thus be seen that by virtue of the arrangement of the inner guide-wall 52 and the radial guide strip $g$, the separating and feeding disks of the two feeding mechanisms are in communication only through an arc running between the guide strip $g$ and the end $52^a$ of the guide-wall 52. When, therefore, the disks are in operation, the boxes or covers placed promiscuously on the separating disk are thrown outwardly by centrifugal force against the inner guide 52 and the radial guide $g$ and some will pass directly through the open space between the disks on to the oppositely-rotating feeding disk. The boxes will be more or less crowded against the radial guide $g$, as shown in Fig. 1, but as the line or row of boxes on the feeding disk advances toward the carrier arm $59^b$, the rear of the row of boxes is being kept constantly replenished from the boxes crowded against the radial guide $g$. In this way the boxes and covers pass automatically from a promiscuous mass on the separating disk to a single line or row on the feeding disk. I have actually constructed and operated a machine like that shown in the drawings, and I have observed that the automatic separation of the boxes and covers into an orderly feeding position by means of oppositely-rotatable disks, is perfect. As best shown in Figs. 1 and 9, the two brackets 56 are roughly triangular in shape, having the curved convergent sides 57 and 58 to accommodate the central dial and the associated feeding disks $B^1$ and $C^1$. In other words, the brackets 56 act as filling pieces between the central assembling dial D and the disks $B^1$ and $C^1$. The upper surfaces of the brackets 56 are substantially level with the assembling dial and the feeding disks. With the box-feeding mechanism is associated a delivery arm $59^b$, and a similar arm $59^c$ is associated with the cover-feeding mechanism. The function of the delivery arms $59^b$ and $59^c$ is to carry or transfer the boxes and covers from the feeding disks onto the assembling dial. The arm $59^b$ is rigidly connected to the upper end of the pivoted shaft $60^b$, while the cover-delivery arm $59^c$ is rigidly connected to the upper end of the rotatable shaft $60^c$. As best shown in Figs. 4 and 6, the shafts $60^b$ and $60^c$ are at their lower ends mounted in the horizontal brackets 61 secured to the inner wall of the machine bed by bolts or other fastening devices 62. At their upper ends the shafts $60^b$ and $60^c$ pass through openings provided in the brackets 56.

The operative connections between the power shaft 30 and the vertical shaft $60^b$ for imparting an intermittent oscillatory movement to the shaft $60^b$, are as follows: To the lower end of the shaft $60^b$ is fixed the crank arm $63^b$ which carries at its free end a roller $64^b$ adapted to operate in the groove $65^b$ of the cam $66^b$. This is shown in Figs. 4, 5, 6 and 7. The cam $66^b$, which is rigidly mounted on the power shaft 30 may be termed the box arm cam, because it causes the operation of the box-feeding arm $59^b$. The path of the cam groove $65^b$ is such as to cause intermittent movement of the arm $59^b$ into and out of feeding position at predetermined intervals, as will be explained in detail later on.

The operative connections between the power shaft 30 and the vertical shaft $60^c$ are quite similar to the operative connections for the shaft $60^b$, and are as follows: To the lower end of the shaft $60^c$ is fixed the crank arm $63^c$ provided at its free end with a roller $64^c$ adapted to operate in the groove $65^c$ of the cam 66ᶜ which is rigidly mounted on the power shaft 30. The lateral deviations of the cam groove 65ᶜ are similar to those of the cam groove 65ᵇ but run in the opposite direction, so that the arms 59ᵇ and 59ᶜ are simultaneously actuated in opposite directions. That is to say, the arms are simultaneously rocked into feeding position over the dial, and are simultaneously withdrawn at the right moment. As the cam 66ᶜ actuates the cover-feeding arm 59ᶜ, it may properly be termed the cover arm cam.

The normal or unoperated position of the arms 59ᵇ and 59ᶜ is shown in Fig. 1, while the feeding or operated position is shown in Fig. 9. The guide piece 55 associated with each of the arms is provided with a curved slot 67 adapted to receive the extension 68 on the arms 59ᵇ and 59ᶜ when the arms are in normal position, as shown in Fig. 1. The center of curvature of each of the slots 67 and the extension 68 of the associated carrier arm is substantially coincident with the axis of rotation of the arm, so that the extension 68 may freely move into and out of the slot 67. Each of the arms 59ᵇ and 59ᶜ is provided at its free end with a curved recess 69 shaped to receive the box or cover for delivery on to the assembling dial D. When the arm 59ᵇ or 59ᶜ is in normal position, as shown in Fig. 1, the extension 70 which forms a portion of the recess 69 extends across the travel path of the line of boxes or covers on the associated feeding disk B¹ or C¹. The extension 70 thus constitutes a stop for the feeding line of boxes or covers. As previously explained, the disks of the box and cover-feeding mechanisms rotate continuously during the operation of the machine. However, the boxes and covers are removed from the feeding disk at predetermined intervals. As these boxes and covers are very light, they offer practically no resistance to the continuous rotation of the feeding disk and exert but little pressure against the extension 70 on the arms 59ᵇ and 59ᶜ. Referring to Fig. 1, it will be clear that when the arm 59ᵇ is rocked in a counter-clockwise direction, the foremost box X¹ which rests in the recess 69 will be carried over the dial into a position in vertical alinement with one of the openings 2. Similarly, when the cover-carrying arm 59ᶜ is rocked in a clockwise direction from the position shown in Fig. 1, the foremost cover V¹ is carried over the dial in vertical alinement with an opening 2 containing a packed box. The automatic packing of the empty box with the desired material will be explained in detail later on. The intermittent movements of the dial D are so timed that when the box-feeding arm 59ᵇ is in feeding or operated position, one of the openings 2 will always be in position to receive the fed box. The box-receiving position of the openings 2 in the assembling dial is that indicated at 2ᵇ in Fig. 9, while the cover-receiving position of the openings corresponds to the position of the opening 2ᶜ. It will be seen from Fig. 9 that when the arms 59ᵇ and 59ᶜ are in operated position, the two extensions 68 project across the path of the boxes and covers on the feeding disks and thereby form a positive stop for the same. It will thus be clear that the arms 59ᵇ and 59ᶜ are each so constructed as to form stops for the feeding lines of boxes and covers, both when the arms are in normal position as well as when they are in operated position.

In order to centralize the empty boxes as they are delivered on to the dial by the arm 59ᵇ, I provide an arm 71 which has a curved end extending over the dial and so arranged as to form with the recess 69 of the arm 59ᵇ a chamber in which the fed box momentarily rests in vertical alinement with the opening which is in box-receiving position 2ᵇ, as shown in Fig. 9. Were it not for the centralizing arm 71, the boxes might be carried too far over the dial by the arm 59ᵇ. The arm 71 is rigidly held in position in any suitable way. In the drawings, the arm is shown attached to a bracket 72 mounted on the top plate 1 of the machine bed. This bracket, like the opposite bracket 56, is shaped to fill in the space between the assembling dial and the feeding disk B¹. As will be explained later on, when an empty box has been fed into position on the dial, it rests on a box-supporting plug which extends through the opening in position 2ᵇ on a level with the surface of the dial. The box need not therefore be held clamped between the centralizing arm 71 and the carrying arm 59ᵇ. It is different, however, with the covers which must be held over the dial in alinement with the packed boxes in the opening 2ᶜ until the plunger mechanism descends and forces the cover over the box. In order to hold the covers in this position, the centralizing arm 73, which coöperates with the arm 59ᶜ to centralize the covers in the same manner as the arm 71 coöperates with the arm 59ᵇ to centralize the empty boxes, has on its inner side attached thereto a spring blade 74 to yieldingly press the cover against the wall of the recess 69, as best shown in Fig. 19. The box is thus held clamped between the spring 74 and the feeding end of the arm 59ᶜ until the plunger mechanism forces the cover over the packed boxes.

In order to stop the feeding of the boxes and covers without stopping the operation of the machine, I provide a slide 75 at the outer end of each of the guide pieces 55. A screw 76 on the guide piece 55 extends through the longitudinal slot 77 of the slide 75. By slightly loosening the screw 76, the slide 75 may be moved across the feeding line of boxes and covers to form a stop or obstruction for the same. The slide 75 is provided with a handle 78 for easy manipulation into position.

*Material-feeding mechanism and connections.*—The mechanism for automatically conveying a predetermined quantity of material into feeding position over the dial, is located to one side of the dial substantially midway between the box and cover-feeding mechanisms. In describing the details of the material feeding-mechanism reference will be made to Figs. 1, 2, 3, 7, 9 and 20 to 23 inclusive.

Figure 7:
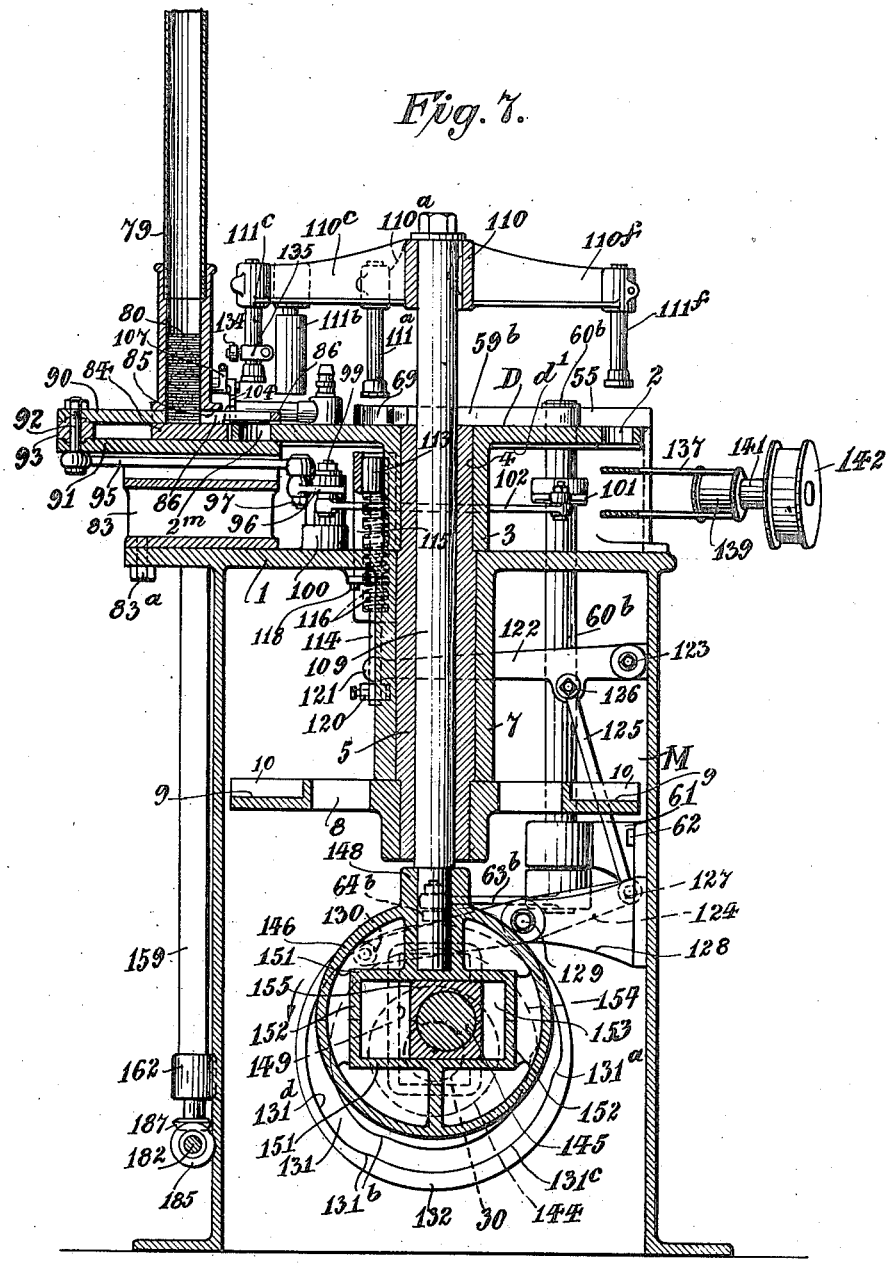
Fig. 7 is a transverse cross-sectional view on line 7—7 of Fig. 1.

The material to be packed in the boxes is contained in a vertical magazine tube 79 of sufficient height to hold a desired quantity of material. In the drawings, the material is represented at 80 in the form of circular chips which may be chewing-gum, candy, compressed tobacco or the like. The magazine tube 79 is provided with a base 81 through which screws or bolts 82 pass into the bracket 83, as best shown in Fig. 23. As seen from Figs. 22 and 23, the bracket 83 has the general outlines of an I-beam and is secured to the top plate 1 of the machine bed by bolts 83ᵃ. The bracket 83 extends into the space $d^e$ between the previously-described brackets $d^3$ and $d^4$. A spacing plate 84 is interposed between the base 81 and the bracket 83. This spacing plate not only serves to maintain the magazine tube 79 in proper feeding relation to the dial, but it also acts as a support for the column of articles in the magazine when the material feeding slide (to be presently referred to) is in normal or withdrawn position, as shown in Fig. 7. As seen from Fig. 20, the spacing plate 84 is substantially at the same height as the assembling dial. In the opening 85 of the base 81 is secured a stationary U-shaped guide 86 by means of screws 87. As seen from Figs. 21 and 23, the legs of this guide are arranged in recesses 88 in the opening 85, so that the space between the inner sides of the legs is substantially of the same diameter as the bore of the magazine tube. The transverse portion of the U-shaped guide 86 is rounded as indicated at 89 to form a guide or stop for the material in feeding position over the dial. In the space between the legs of the U-shaped guide 86 operates the feeding slide 90 which is at its rear end connected to the slidable guide piece 91 by means of a bolt 92 passing through the spacing block 93. The forward or engaging end of the feeding slide 90 is curved, as indicated at 90ᵃ in Fig. 21, to conform to the contour of the articles in the magazine tube. The slidable guide piece 91 operates in the channel 94 of the bracket 83, as best shown in Figs. 22 and 23. The guide piece 91 slides beneath the spacing plate 84 and the assembling dial D, and acts as a support for the boxes in packing position. Figs. 20 and 22 show very clearly how the box X³ in the opening 2ᵐ is supported on the guide 91. To the lower end of the bolt 92 is connected one end of the link 95, the other end of which is connected with the free end of the arm 96 through the pin 97, as shown in Figs. 9, 20 and 21. As seen from Figs. 20 and 22, the link 95 passes through the groove or channel 83ᵇ provided in the bracket 83 below the groove 94 in which the slide 91 operates. The arm 96 is provided with a hub 98 by means of which it is pivotally mounted on the pin 99 extending upwardly from the boss 100 on the top plate 1 of the machine bed, as best shown in Fig. 20. Referring to Figs. 7 and 9, it will be seen that the arm 96 is connected with the arm 101 on the rock shaft 60ᵇ by means of the link 102. As the point of connection 102′ between the link 102 and the arm 96 is much nearer to the pivotal point of the arm 96 than the connection of the link 95, the movement of the arm 101 is multiplied in effecting reciprocation of the link 95 and therefore of the feeding slide 90. The operative connections between the vertical shaft 60ᵇ and the power shaft 30 have already been described. As the shaft 60ᵇ also operates the box carrier arm 59ᵇ, it is obvious that the feeding slide 90 operates simultaneously with the two carrier arms of the box and cover-feeding mechanisms. The connections between the shaft 60ᵇ and the material-feeding slide 90 are such that when the arms 59ᵇ and 59ᶜ are in normal or unoperated position, as shown in Fig. 1, the feeding-slide 90 is in withdrawn position—that is to say, away from the dial, as shown in Figs. 1 and 7. With the slide 90 in the position shown in Fig. 7, the column of articles 80 rests upon the plate 84. The curved engaging end 90ᵃ of the feeding slide 90 forms substantially a continuation of the magazine tube, so that as soon as the slide begins to move inwardly (to the right, as viewed in Fig. 7) a predetermined quantity of the articles is pushed out of the magazine tube by the carrier through the opening 85. The quantity of articles thus conveyed into feeding position at each forward operation of the slide 90, depends upon the thickness of the slide. When the feeding slide 90 is out of normal position, the column of articles rests upon the slide itself, as shown in Fig. 20. As soon as the slide reaches its normal position again, the articles drop down upon the spacing plate 84, as shown in Fig. 7. The material which is pushed out of the magazine by the slide 90 is conveyed to an adjustable support on which it remains until the plunger mechanism (to be described hereafter) withdraws the support from underneath the material, which thereupon drops into the empty box beneath. As shown in Figs. 20, 21 and 22, this adjustable support comprises a pair of supporting blades 103 carried at the lower end of a pair of levers 104 pivoted on the pins 105 extending from the magazine tube 79. As best shown in Fig. 22, the levers 104 have oppositely-disposed extensions 106. The levers 104 are also provided with upper extensions 107 between which a coil spring 108 is arranged to force the lower ends of the levers inwardly, so that the blades 103 project at their free ends into the space between the legs of the U-shaped guide 86, for supporting the material $80^a$ which the slide 90 pushed out of the magazine tube. As seen from Fig. 21, when the slide 90 is in operated position, the recessed end $90^a$ forms with the curved portion 89 of the guide 86 a substantially circular recess or chamber in which the material is temporarily supported on the blades 103. It will be clear from Fig. 22 that when the extensions 106 of the levers are separated, the supporting blades 103 are withdrawn from under the material $80^a$, and the latter drops into the box $X^3$ beneath. This operated position of the supporting levers 104 is indicated in dotted lines in Fig. 22. The mechanism for operating these levers into releasing position will be described under the next succeeding heading.

*Plunger mechanism and connections.—* Thus far, I have described how the empty boxes are fed into position on the dial, how the material is fed into the boxes, and how the covers are carried over the dial into position to be forced on to the packed boxes. I will now describe the plunger mechanism which insures the proper position of the empty boxes on the dial, insures the proper packing of the fed material into the empty boxes and places the covers on the packed boxes. Through the sleeve 5 which carries the assembling dial D extends the vertical reciprocating plunger shaft 109 to the upper end of which is rigidly secured the spider 110 comprising six arms arranged as shown in Fig. 1 and numbered $110^a$, $110^b$, $110^c$, $110^d$, $110^e$ and $110^f$. At their free ends these spider arms carry vertical plungers indicated respectively by $111^a$, $111^b$, $111^c$, $111^d$, $111^e$ and $111^f$. As will appear later on, the plungers $111^b$ and $111^d$ are each associated with a blank feeding-mechanism—one for feeding blanks into the empty boxes and the other for feeding blanks into the packed boxes. If my machine is used without these blank feeding mechanisms, there would of course be no occasion for providing the arms $110^b$ and $110^d$ on the spider 110. The plunger $111^a$ is in vertical alinement with the box-receiving position $2^b$ of the dial openings, while the plunger $111^c$ is in vertical alinement with the cover-receiving position of these openings. These two positions are shown in Fig. 9, and have been previously referred to. The plunger $111^e$ is in vertical alinement with the material-receiving position of the boxes, as shown in Fig. 20. The plunger $111^f$ which is diametrically opposite the plunger $111^c$, has for its function the discharge of the sealed boxes from the dial into the banding mechanism. Where the banding mechanism is dispensed with, the plunger $111^f$ might not be necessary, as the sealed boxes would by gravity fall through the space $b^5$ between the plates $d^1$ and $d^2$ on to a suitable conveying belt. However, even in this case it might be desirable to use the plunger $111^f$ so as to prevent any sealed box from accidentally sticking in its opening in the dial. The plungers $111^a$, $111^c$, $111^e$ and $111^f$ terminate in heads 112 of slightly less diameter than the openings in the dial so as to work freely therein. The heads of the plungers $111^a$ and $111^e$ are slightly smaller in diameter than the boxes because, as will presently appear, these plunger heads are adapted to enter the boxes.

The operation of the plunger $111^a$ to properly position the empty boxes in the openings on the dial, is best shown in Figs. 29 and 30, to which reference will now be made. Mounted beneath the dial in vertical alinement with the box-receiving openings $2^b$, is a vertically movable box-supporting plug 113. I might here explain that when I refer to the opening $2^b$ in the dial D, I mean any opening which happens to be in box-receiving position, as indicated at $2^b$ in Fig. 9, so that the expression "opening $2^b$" (or $2^c$) indicates a certain position of any opening rather than any particular opening. The plug 113 is provided with a stem 114 mounted in the bushing 115. A coil spring 116 is housed in the bushing and surrounds the stem 114 to force the plug upwardly into the position shown in Fig. 29 when free to operate. The bushing 115 projects through an opening 117 in the top plate 1 of the machine bed, and is secured in place by screws or bolts 118 passing through the annular flange 119 on the bushing into the top plate 1. The lower end of the stem 114 extends below the bushing 115 and carries a fixed collar 120 adapted to be engaged by the forked end 121 of the lever 122. As shown in Fig. 7, the lever 122 is pivoted to the machine bed at 123, and is connected with the lever 124 by a link 125 which is pivoted to the lever 122 at 126, and to the rear end of the lever 124 at 127. The lever 124 is pivotally mounted on the bracket 128 by means of the pin 129. As shown in Fig. 7, the bracket 128 is supported on the machine bed by bolts or other fastening devices 128'. At its other end the lever 124 carries a roller 130 arranged to operate in the groove 131 formed in the face of the cam 132. As best shown in Fig. 7, the cam groove 131 has two working portions indicated by 131$^a$ and 131$^b$ and two rest portions indicated by 131$^c$ and 131$^d$. As long as the roller 130 of the cam lever 124 works in the portion 131$^d$ of the cam groove 131, the plug 113 is in its lowermost position, as shown in Fig. 7. The direction of rotation of the cam wheel 132 is counter-clockwise as viewed in Fig. 7. When the roller 130 enters the portion 131$^a$ of the cam groove, the forward end of the lever is forced down and the rear end thrown up, thereby rocking the lever 122 upwardly. This upward movement of the lever 122 allows the coil spring 116 to assert itself and throw the plug 113 upwardly into the position shown in Fig. 29. While the roller 130 remains in the portion 131$^c$ of the cam groove, the lever 122 and the plug 113 remain in raised position. As the roller 130 passes through the portion 131$^b$ of the cam groove 131, the rear end of the lever 124 is pulled down and with it the lever 122 and the plug 113. It will be observed from Fig. 29 that when the plug 113 is in its highest position, it is substantially flush with the upper surface of the dial D, so that in effect the plug forms part of the dial. The box-supporting plate $d^1$ arranged beneath the dial is provided with an opening 133 to accommodate the plug 113. The movements of the box-carrier arm 59$^b$ are so timed with the movements of the plug 113 that the plug is always in its upper position when the arm 59$^b$ arrives with the empty box X$^1$ in feeding position. A moment or two after the empty box has been deposited on the plug 113, the head 112 of the descending plunger 111$^a$ enters the box and during the continued descent of the plunger mechanism forces the box downwardly into the opening 2$^b$, as shown in Fig. 30. The box is virtually held clamped between the head of the plunger 111$^a$ and the plug 113. During the interval that the plunger 111$^a$ engages the box X$^1$, the roller 130 operates in the portion 131$^b$ of the cam groove 130 to cause lowering of the plug in synchronism with the downward movement of the plunger mechanism. The downward movement of the lever 122 to pull down the plug 113 need not be timed very exactly with the downward movement of the plunger mechanism, because the plug 113 will be forced down by the plunger 111$^a$ even if the lever 122 remains in its upper position. It is only necessary that when the plunger has reached the end of its downward movement, the lever 122 be in position to hold the plug down against the action of the spring 116.

It will be clear from the foregoing description of the operation of the plug 113 and the plunger 111$^a$ that the empty boxes are always fed properly on to the dial openings. In the absence of the plunger 113, a box might easily tilt over the opening 2$^b$, as the arm 59$^b$ reaches the limit of its feeding movement. Such tilting would prevent the box from entering the opening in the dial, and the plunger 111$^a$ would simply crush the box into a shapeless mass. However, by providing the plug 113 to receive the empty boxes as they are fed across the dial an upright position of the boxes is always insured.

Figure 2:
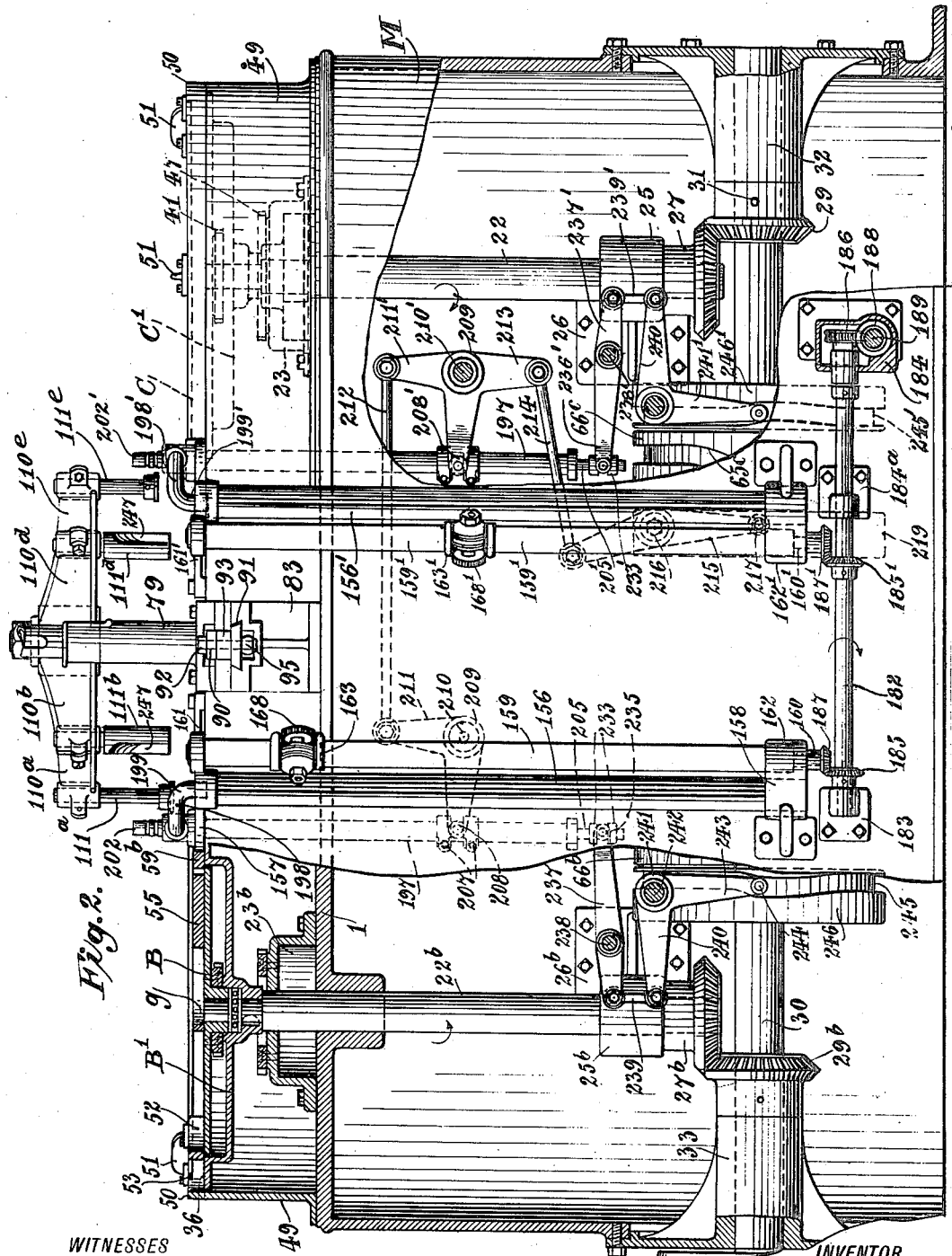
Fig. 2 represents a side elevation, portions of the supporting framework or machine bed being broken away to expose interior parts.

The plunger 111$^c$ carries a roller 134 arranged to engage the extensions 106 on the levers 104 to force the same apart, as shown in Figs. 20 and 22. The roller 134 is secured in position on the plunger 110$^c$ in any suitable manner. In the drawings I have shown a band or collar 135 rigidly clamped on the plunger 111$^c$ and provided with a pin or stud 136 on which the roller 134 is mounted. As previously explained in connection with the operation of the material-feeding mechanism, the levers 104 are normally held in the position shown in full lines in Fig. 22 by the spring 108, so that the blades 103 are in position to support the material 80$^a$ pushed out of the magazine tube 79 by the slide 90. The action of the slide 90 is so timed that the material or articles 80$^a$ are in position over the supporting blades 103 before the roller 134 engages the extensions 106 of the levers 104. As soon as the levers 104 are forced apart by the roller 134, which acts as a wedge between the extensions 106, the material 80$^a$ drops into the box X$^3$, closely followed by the head of the descending plunger 111$^c$. Should the material 80$^a$ be for any reason caught or held in the guide 86 after the supporting blades 103 have been withdrawn, the plunger 111$^c$ would force the material into the boxes. Fig. 20 shows how the head 112 of the plunger 111$^c$ is on top of the articles in the box to insure their proper position therein. As the plunger 111$^c$ does not extend to the bottom of the boxes, like the plunger 111$^a$ it is necessarily shorter than the latter by an amount equal to the thickness of the material in the box. Figs. 2 and 3 show the relative lengths of the plungers 111$^a$ and 111$^c$.

The plunger 111$^e$ which may be called the cover-positioning plunger is adapted to force the covers V$^1$ from between the centralizer 73 and the carrier-arm 59$^c$, as shown in Fig. 19, down on the packed box X$^2$. How the covers are carried into the position shown in Fig. 19, has already been explained in detail.

The plunger 111$^f$ operates to discharge the sealed boxes when they reach the position indicated at 2$^f$ in Fig. 9. In this figure, the banding mechanism is not shown for lack of space and the boxes are discharged from the dial D directly on to a suitably arranged conveyer belt 137. The belt is shown as hung about a pair of rolls or spools 138 and 139

139, one of which is carried on the bracket 140 and the other on the stub shaft 141. A power pulley 142 is fixed to one end of the shaft 141 for rotating the belt. The bracket 140 is secured to the top plate 1 of the machine bed by screws or bolts 143. The arrangement of the conveyer belt 137 as shown in Fig. 9 is more or less diagrammatic and may be changed in many ways by those skilled in the art. As the boxes are discharged from the dial they drop on the belt 137 and are conveyed by it into a suitable receptacle. As soon as the sealed boxes (shown at $X^4$ in Fig. 9) pass off the supporting plate or shelf $d^2$, they drop by gravity out of the dial openings on to the conveyer belt. However, should a box happen to be held frictionally in its opening, as by tilting when it leaves the plate $d^2$, the plunger $111^1$ will force the box out of the opening when the plunger mechanism descends.

The operative connections between the main power shaft 30 and the vertical plunger shaft 109 for causing uniform reciprocation of the latter, are as follows: Referring to Figs. 4, 6 and 7, it will be seen that the power shaft is provided with a pair of disks 144 connected together by the crank pin 145. The crank pin 145 may be regarded as a radially displaced portion of the power shaft. To the lower end of the plunger shaft 109 is rigidly secured the hollow crank block 146 which is shown as substantially spherical in form. This block may conveniently be formed of two halves which are secured together by bolts 147. The lower end of the shaft 109 extends into an opening in the hub portion 148 of the crank block. The shaft 30 extends into the crank block through vertical openings 149. Bearing collars 150 are preferably provided on the shaft 30 where it extends into the crank block. The two halves of the crank block have formed thereon upper and lower walls 151 and vertical side walls 152 which coöperate to form the transverse chamber 153. The walls 151 and 152 of the upper half of the crank block may conveniently be formed as extensions of the hub portion 148, while the walls 151 and 152 of the lower half are connected to the shell of the block through webs 154. In the transverse chamber 153 operates the rectangular guide block 155 which surrounds the crank pin 145. It will be clear from the above that as the shaft 30 is continuously rotated, the crank pin 145 produces vertical reciprocation of the shaft 109. The circular motion of the crank pin causes sliding of the guide block 155 in the transverse chamber 153, while at the same time the crank block and the connected shaft 109 are carried up and down by the crank pin. This sliding connection between the crank pin 145 and the crank block 140 is necessary to convert the rotary motion of the crank pin into a vertical movement of the crank block. It will be observed that the connection between the crank block 146 and the power shaft 30 is such that horizontal rotation of the crank block is impossible. This is quite essential because the plungers of the plunger mechanism must always be kept in strict alinement with their respective openings in the assembling dial. Any horizontal movement of the shaft 109, however little, would disturb the predetermined positions of the different plungers and be sure to put the machine out of commission, because the heads 112 on the plungers fit pretty closely in the dial openings. It will of course be understood that the crank connection between the power shaft 30 and the plunger shaft 109 is calculated to produce the proper amount of vertical reciprocation of the plungers.

*Blank feeding-mechanisms and connections.*—The particular embodiment of my invention illustrated in the accompanying drawings includes two blank feeding-mechanisms, one of which is adapted to feed a suitable blank to the empty box before it reaches the packing position, while the other mechanism is adapted to feed a blank to the box after it has been packed and before the cover is put on. For the sake of distinguishing these two mechanisms, I will refer to the first as the patch-feeding mechanism and to the second as the picture-feeding mechanism. It so happened that the first use to which my invention was actually put was the packing of tin boxes with chewing-gum chips, and it was desirable that a disk of moisture-proof paper be put at the bottom of each box in order to prevent the possible sticking of the bottom piece of gum to the box. As this disk of paper was called a patch, I call the mechanism for feeding the same the patch-feeding mechanism. Also, in that use of the machine, the second blank feeding mechanism carried a paper disk having a picture thereon over the packed box. Hence I call this second blank feeding-mechanism the picture-feeding mechanism. While the patch and picture may broadly be referred to as blanks, I will maintain the specific name for it merely for the sake of clearness.

As the patch and picture feeding-mechanisms are in their main points identical in their construction and operation, it will not be necessary to describe each of them in detail. For the sake of illustration, I will describe the details of the patch-feeding mechanism. The patches or paper disks are contained in a vertical magazine tube 156 held in position at one side of the machine bed by the brackets 157 and 158, as best shown in Fig. 2. The bracket 157 is bolted to the top of the bracket 72, as shown in Fig. 9. The lower bracket 158 is secured to the side of the machine bed and has an opening into which the lower end of the magazine tube 156 extends. Adjacent to the tube 156 is mounted a hollow angular guide 159 adapted to receive the patch-feeding screw shaft 160, as shown in Figs. 26 and 27. The upper end of the guide 159 engages in the bracket 161, as shown in Fig. 9, while the lower end rests in the extension 162 of the bracket 158, as shown in Figs. 2 and 6. Movably mounted on the annular guide 159 is a slide 163 which is conveniently made up of two halves held together by bolts or screws 164. This slide is provided with a pair of spaced journal bearings 165 and 166 in which is mounted the stub shaft 167 carrying the gear wheel 168. The teeth of this wheel are formed to be constantly in engagement with the screw shaft 160, so that as the shaft is rotated the slide 163 is gradually elevated. During this operation, the wheel 168 remains stationary and simply acts as a connecting member with which the spiral threads of the screw shaft are constantly in slidable engagement. The slide 163 is provided with a longitudinal slot 169 through which the wheel 168 connects with the screw shaft. The slide 163 is provided with an arm 170 which extends into the magazine tube 156 through a longitudinal slot 171. The arm 170 is provided with a plate 172 for supporting the column of patches 173, as best shown in Fig. 26. As the screw shaft 160 is rotated (through connections to be presently described) the supporting plate 172 gradually rises and elevates the column of patches, whereby the top of the column is kept substantially at the same height in operative relation to the patch-carrying arm which removes the patches out of the magazine one by one. If desired, a coil spring may be interposed between the column of patches and the supporting plate 172, so as to provide a yieldable support for the patches.

In order to permit manual adjustment of the wheel 168 up and down the screw shaft 160, I have provided an adjustable friction device on the shaft 167 of the wheel. This device comprises a central stationary disk 174, a pair of rotatable disks 175 and 176 on either side of the stationary disk, and a pair of interposed fiber disks 177 and 178. The disks 174, 175 and 176 are of metal. The disks 175 and 176 are connected to the shaft 167 by keys 179, but are adapted to slide longitudinally on the shaft. The shaft extends loosely through the disks 174, 177 and 178, and is at its outer end provided with adjustable nuts 180 which bear against the spider spring 181. The disk 174 is held against rotation by the pin 182 projecting from the slide 163 and engaging the extension 174ª of the disk. The connection between the pin 182 and the extension 174ª is sufficiently loose to permit slight axial movement of the disk 174 on the shaft 167. When the nuts 180 are screwed tight, the spring 181 forces the disks 175 and 176 tightly against the stationary disk 174 through the friction disks 177 and 178. This holds the shaft 167 and therefore the wheel 168 against rotation. To adjust the position of the wheel on the shaft manually, it is only necessary to loosen the nuts 180 and then turn the disk 175 in one direction or the other, according as the wheel is to be moved up or down the screw shaft. The loosening of the nuts relieves the pressure of the spring against the disks and permits the disk 175 to be readily rotated. During this manual manipulation of the wheel 168, the screw shaft 160 acts as a rack. The teeth on the wheel 168 are so formed as to permit the rotation thereof over the spiral threads of the screw shaft.

I will now describe the operative connections leading from the power shaft 30 to the screw shaft 160. As best seen from Fig. 2, a horizontal shaft 182 is journaled below the screw shaft 162 in bearing brackets 183, 184 and 184ª. These brackets extend from the side of the machine bed. One end of the shaft 182 carries a bevel gear 185, while the other end carries a worm gear 186. The bevel gear 185 meshes with the bevel gear 187 fixed at the lower end of the screw shaft 160. The worm gear 186 is in engagement with the worm 188 fixed upon the outer end of the transverse counter shaft 189, as shown in Figs. 3 and 6. The inner end of the shaft 189 is journaled in the bearing portion 190 of the bracket 191 which is secured to the side of the machine bed by bolts or other fastening devices 192. Near its inner end the shaft 189 is provided with the spiral pinion 193 which meshes with the teeth of the pinion 194 mounted at the lower end of the vertical connecting shaft 20ª, as best shown in Figs. 3, 4 and 6. The shaft 20ª is at its lower end journaled in the bearing portion 195 of the bracket 191, while the upper portion of the shaft extends through the bushing 196 projecting downwardly from the top plate 1 of the machine bed. The upper end of the shaft 20ª extends beyond the top plate and has secured thereto the gear wheel 20 which, as stated in the forepart of the detailed description, connects the gear 19 with the gear 21. It will now be clear that the screw shaft 160 receives motion from the power shaft 30 through the following connections: power shaft 30, intermeshing bevel gears 29 and 27, shaft 22, gear 21, gear 20, shaft 20ª, inter-meshing worm gears 194 and 193, transverse countershaft 189, intermeshing worms 188 and 186, shaft 182, intermeshing bevel gears 185 and 187, and screw shaft 160. These connections are best shown in Figs. 2, 3 and 6, and the direction of rotation of the different shafts and gears is indicated by arrows.

As the details of construction of the magazine tube and associated screw feed for the picture-feeding mechanism are identical with those described for the patch-feeding mechanism, the foregoing description need not be repeated with respect to the picture feeding-mechanism. It is sufficient to indicate corresponding parts of the patch feeding and picture feeding mechanisms with the same reference characters, except that for the sake of distinction a prime mark (') is used with the reference characters for the picture feeding-mechanism. It will be seen from Fig. 2 that the screw shaft 160' is connected through the gear 187' with the gear 185' fixed upon the shaft 182. In the drawings the gear 187' is of greater diameter than the corresponding gear 187 of the patch screw shaft, in order to feed the column of pictures upwardly more slowly than the column of patches, because the pictures that were actually used in the operation of my machine were considerably thinner than the patches. It will of course be understood that the proper amount of feed of the two columns of blanks depends upon the thickness of the blanks which may vary in the different uses to which my machine may be put.

Associated with the magazine tube 156 is the vertical air tube 197 having a hollow horizontal arm 198 adapted to swing back and forth between the magazine tube 156 and the openings in the assembling dial D. The free end of the arm 198 is curved downwardly, as shown at 199 in Figs. 2, 10, 11, 12, 13 and 15. The end 199 is also displaced laterally with respect to the main body portion of the horizontal arm 198 through the neck portion 198ª, as best shown in Figs. 1, 9 and 14. The hollow arm 198 is connected with the air chamber 200 at the top of the tube 197 through the restricted passage way 201, as shown in Figs. 10, 11 and 12. The air tube 197 is provided with a tapered extension 202 to permit ready attachment of a flexible tube 203 leading from a suitable source of exhaust. In the tube 197 operates a valve 204 provided with a stem 205 which projects through the bottom of the tube 197, as shown in Figs. 10, 11 and 12. The valve 204 is vertically movable in the air tube to control the connection between the hollow arm 198 and the source of exhaust. The tube 197 is arranged to slide up and down as well as to rotate horizontally and it is guided in these movements by the sleeve 206 extending downwardly from the top portion 1 of the machine bed, as best shown in Fig. 10. Vertical movement of the air tube 197 is produced from the power shaft 30 through the following connections: Two collars 207 are fixed on the tube 197 and spaced apart to form an annular groove or channel 207' in which engage the yoke arms 208 of the bell crank 209, as shown in Fig. 10. The free ends of these arms are preferably provided with rollers that work freely in the channel 198 so as not to interfere with the horizontal rotation of the air tube by connections to be presently described. The bell crank 209 is rotatably mounted upon a stud or pin 210 extending horizontally from the inner side wall of the machine bed. A double bell crank 209' is mounted on the stud 210' projecting from the side of the machine bed. The bell crank 209' is provided with a pair of spaced yoke arms 208' which engage the picture air tube 197', in the same manner that the yoke arms 208 of the bell crank 209 engage the patch tube 197. The upper arm 211 of the bell crank 209 is at its free end connected with the free end of the upper arm 211' of the bell crank 209' through the connecting link 212. The lower end of the downwardly-extending arm 213 of the bell crank 209' is pivotally connected with one end of the link 214, the other end of which is pivoted to the upper end of the lever 215 journaled on the pin or stud 216 projecting from the side wall of the machine bed. (See Figs. 2, 3 and 6.) The lower end of the lever 215 is provided with a roller 217 arranged to operate in the cam groove 218 of the cam 219 which is fixed upon the power shaft 30. The form of the cam groove 218 is such that as the power shaft is rotated in the direction indicated by the arrow on the pulley 34 in Figs. 2 and 6, the lever 215 will be periodically moved in a clockwise direction to lower simultaneously the air tubes 197 and 197', and in a counter-clockwise direction to raise the air tubes. It will be clear from Fig. 2 that when the lever 215 is rocked clockwise, the bell cranks 209 and 209' are rocked counter-clockwise to lower the air tubes. When the lever 215 is rocked in the opposite direction, the bell cranks are rocked clockwise to raise the air tubes. The lowering and raising of the air tubes 197 and 197' occur at predetermined intervals, as will be more particularly described when I come to take up the general operation of my machine as a whole.

The connections for causing horizontal rotation of the air tube 197 from the power shaft 30, are as follows, particular reference being had to Figs. 3, 9 and 10: On the sleeve 206 is journaled the hub member 220 provided with a pair of oppositely-extending arms 221 and 222. The hub member 220 is held on the sleeve 206 between the annular shoulder 223 extending from the top plate 1 and the collar 224 fixed at the lower end of the sleeve 206 by means of the screw 225, or otherwise. The arm 221 carries a pin 226 on which is pivoted one end of the link 227. The other end of this link, as shown in dotted lines in Fig. 9, is pivoted to the free end of the arm 228 fixed upon the vertical shaft 60$^b$, a short distance below the top plate 1. Fig. 3 shows the corresponding arm 228' of the connections for rotating the picture air tube 197', but the arm 228' is mounted precisely in the same way on the shaft 60$^c$. Fig. 3 also shows the hub member 220' on the picture air tube 197', and the connection between the arm 220' and the arm 228' through the link 227'. As seen from Fig. 10, the arm 222 has fixed therein a pin 229 which extends downwardly through an opening in the arm 230 provided on the collar 231 which is rigidly clamped upon the tube 197 by means of the pin 232. As the air tube 197 is moved up and down through the connection previously described, the arm 230 slides over the stationary pin 229 which therefore acts as a guide for the tube and prevents accidental horizontal movement thereof. A similar slidable connection is also provided between the picture air tube 197' and the hub member 220', as clearly shown in Fig. 3, corresponding parts being indicated by the same reference numbers except that (as previously explained) the reference numerals for the parts of the picture feeding-mechanism are primed. The pin 229 also performs the function of connecting the rotatable sleeve 220 with the air tube 197 so that the hub member and the air tube always rotate in unison.

It will be clear from the above description of the connections between the air tubes 197 and 197' and the shafts 60$^b$ and 60$^c$, respectively, that when these shafts are rocked, as previously described, the air tubes are rotated to move their respective arms 198 and 198' from the position shown in Fig. 1 to that shown in Fig. 9. In their normal or withdrawn position, as shown in Fig. 1, the arms 198 and 198' rest with their free ends over their respective magazines, while in the actuated position of the arms the free ends are in alinement with the dial openings 2$^m$ and 2$^n$—that is to say, with openings occupying those positions.

As above stated, the valve 204 is vertically adjustable in the air tube 179 to open or close the passageway 210 between the arm 198 and a suitable source of exhaust with which the flexible tube 203 is in communication. The valve 204 is operated from the main power shaft 30 through the following connections: At the lower end of the air tube 205 are attached two collars 233 spaced apart to provide an annular groove or channel 234 in which operates a pair of rollers 235 carried by the yoke arms 236 provided at one end of the lever 237. This is clearly shown in Figs. 2 and 10. The lever 237 is pivoted on the pin or stud 238 projecting inwardly from that side of the machine bed which is shown broken away in Fig. 2. At its other end, the lever 237 has pivotally connected therewith the link 239, the lower end of which is pivoted to the free end of the arm 240 of the bell crank 241 journaled on the pin or stud 242. This pin, like the pin 238, extends inwardly from that side of the machine bed which is shown partly broken away in Fig. 2. The lower end of the arm 243 of the bell crank 241 is provided with a roller at 244 arranged to operate in the cam groove 245 of the cam wheel 246 fixed upon the power shaft 30. It is clear from Figs. 2 and 10 that when the bell crank 241 is rocked counter-clockwise the valve 204 is raised to close the passageway 201, while the reverse movement of the bell crank lowers the valve to open the passageway. The form of the cam groove 245 is such that the opening and closing of the passageway 201 takes place at predetermined intervals, as will be more specifically described later on. The valve stem 205' operating in the picture air tube 197', is operated through similar connections from the power shaft 30, which connections include the lever 237', link 239', bell crank 241' and the cam wheel 246' fixed upon the power shaft and provided with the cam groove 245'. As seen from Fig. 2, the cam grooves 245 and 245' have radially alined working portions, so that the operation of the patch and picture air valves occurs simultaneously.

From the above description of the patch and picture-feeding mechanisms, their operation will be clearly understood and may briefly be stated as follows: When the patch carrier arm 198 and the picture carrier arm 198' are in lowered position over their respective magazine tubes, as shown in Fig. 11, the passageway 201 is open and the arms are connected with the exhaust, so that a patch or picture will be held by suction against the lower open end of each of these arms. As the air tube raising cam 219 continues to rotate, the air tubes are raised clear of the magazine, as shown in Fig. 10, without however being rotated. The patch or picture adhering to the arm is indicated at 173$^a$ in Fig. 10. During this upward movement of the air tubes, the valves 204 follow the tubes up but not sufficiently to close the passageways 201. When the shafts 60$^b$ and 60$^c$ are rocked toward each other (as indicated by the arrows in Fig. 1) by virtue of the cams 66$^b$ and 66$^c$, the pneumatic carrier arms 198 and 198' are simultaneously moved inwardly over the assembling dial D, the arm 198 carrying a patch and the arm 198' a picture. The patch is held in vertical alinement over the opening 2ᵐ, while the picture is held in vertical alinement over the opening 2ⁿ, as shown in Fig. 9. As the box and cover carrier arms 59ᵇ and 59ᶜ are rigidly connected with the shafts 60ᵇ and 60ᶜ, respectively, it is clear that the arms 59ᵇ, 59ᶜ, 198 and 198', always move in unison. This is shown in Figs. 1 and 9.

During the rotation of the air tubes 197 and 197' the valves 204 remain in open position, and they are closed only when the plungers 111ᵇ and 111ᵈ are about to engage the patch and picture and strip the same from the arms 198 and 198'. Fig. 12 shows clearly how the patch plunger 111ᵇ strips the patch 173ᵃ from the arm 198 and carries it into the empty box X² beneath. The plunger 111ᵇ is a hollow cylindrical member having a portion of its surface cut away at 247 to receive the laterally displaced end 199 of the arm 198. The internal diameter of the plunger 111ᵇ is less than that of the patches, so as to strip the same from the arm 198, during the descent of the plunger mechanism. The picture plunger 111ᵈ is identical in construction and operation with the patch plunger 111ᵇ, except that it is shorter than the patch plunger by substantially the depth of a box. This difference in length between the plungers 111ᵇ and 111ᵈ is necessary because the patch plunger carries the patch to the bottom of the empty box, while the picture plunger deposits the picture on top of the material packed in the box. To prevent more than one patch and picture from adhering to the arms 198 and 198', the patch and picture magazines 156 and 156' may be provided at the top with stripping springs which are arranged on the outside of the magazines and project through openings into the same over the column of patches and pictures. As the arm 198 or 198' is raised, the inwardly projecting heads of the springs are cammed outwardly by the patch or picture adhering directly to the arm, and should a second patch or picture adhere to the first one, the springs would strip the same and retain it in the magazine. As these stripping springs are an old expedient, I have not deemed it necessary to illustrate them. While these stripping springs have been found to work well with the thin and readily flexible pictures, I prefer to use a different stripping mechanism for the patches which are of considerable thickness as compared with the pictures. This new form of patch-stripping mechanism is shown in Figs. 13, 14 and 15. To the patch magazine 156 near the top thereof, is rigidly secured the bearing 248 in which is journaled the pin or stud 249. To the upper end of the pin 249 is fixed the circular plate 250 having a radial slot 251. The hub portion 252 of the plate 250 serves to hold the plate spaced at a fixed distance above the top edge of the magazine tube 156, as shown in Figs. 13 and 15. The slot 251 in the plate 250 is in the direction of movement of the vertical end portion 199 of the arm 198, so that the lower end of the arm may pass freely through this slot, as indicated in Fig. 14. Into the space 253, between the plate 250 and the top of the magazine tube 156, extends the stripping lug 254 carried at the upper end of the bar or strip 256 securely attached to the magazine tube by screws 256, or in any other suitable way. The stripping lug 254 lies over the top edge of the magazine and its inner end is substantially flush with the inner wall of the magazine. This lug is preferably arranged substantially midway of the slot 251, as shown in Fig. 14, so that in moving away from the magazine, the lower end of the arm 198 moves directly toward the lug. When the arm 198 is in raised position, its lower end is substantially flush with the lower surface of the plate 250, as shown in Fig. 15. The space 257 between the undersurface of the disk 250 and the upper surface of the stripping lug 254 is slightly greater than the thickness of a single patch. Consequently, should a second patch 173ᵇ adhere to the first patch 173ᵃ, it would encounter the lug 254 as the lower end of the arm 198 moved from over the magazine, and be thereby stripped from the patch 173ᵃ, and fall back into the magazine tube. By this simple means I positively prevent more than one patch being carried out of the magazine at one time. The plate 250 also serves the function of a cover for the magazine to prevent the top of the column of patches from being forced out of the magazine by virtue of the inherent resiliency of the superposed patches. I found that when a column of cardboard patches was pressed down by the arm 198 in descending into the magazine, the column of patches would follow the arm up as the pressure was released and but for the cover plate 250 a portion of the column would have protruded beyond the magazine tube. Also the presence of the plate 250 allows a greater initial charge of patches in the magazine, than would otherwise be possible, for the patches can be pressed down into the tube and when released the top of the column will bear against the underside of the plate. The plate 250 is held in its operative position over the magazine by means of a flat spring 258 secured to the outside of the magazine tube by means of screws or rivets 259. At or near its free end this spring bears against the flat portion 260 of the collar 261 fixed upon the lower end of the pin 249. When the plate 250 is swung away from the magazine, the collar 261 forces the spring inwardly. When the plate is moved over the magazine again, the spring 258 automatically forces it into the position shown in Fig. 14.

When the column of patches in the magazine tube 156 rests on a suitable spring support which constantly forces the uppermost patch against the undersurface of the plate 250, the vertical movement of the air tubes 197 and 197' may be dispensed with, provided the lower end of the arm 198 is substantially flush with the undersurface of the plate 250, as shown in Fig. 15.

*Box-stripping patch plunger, as shown in Figs. 16, 17 and 18.*—In order to prevent the patch plunger from accidentally pulling the box out of its opening during the ascent of the plunger mechanism, I provide the patch plunger with a stripping device which holds the box within the dial opening by positively engaging the upper edge of the box. Figs. 16, 17 and 18 show this preferred form of box-stripping patch plunger. The plunger proper consists of a tubular body portion 262 having an opening 263, quite similar to the previously described patch plunger 111$^b$. The plunger is provided with a tubular extension 264 by means of which it is rigidly secured to the spider arm 110$^b$. The box-stripping attachment consists of a pair of oppositely-arranged wings 265 adapted to slide in grooves 266 on the plunger. The stripping wings are rigidly connected together by a semi-circular band 267 which is connected to the wings by bolts or screws 268. The wings 265 are provided with inwardly-extending lugs 269 adapted to extend into the annular groove or channel 270 formed in the plug 271. The stem 272 of this plug extends through the hollow extension 264 of the plunger and is surrounded by the coil spring 273, the tendency of which is to force down the plug and the connected stripping wings. The main body portion 262 of the patch plunger is slotted at 274 to accommodate the inwardly extending portions 275 of the stripping wings. The head of the plug 271 fits snugly in the plunger 262. Adjustable nuts 276 at the upper end of the stem 272 limit the downward movement of the spring-pressed strippers. It will be seen from Fig. 16 that the stripping wings 265 extend a little beyond the dial openings, so that when the plunger descends, the stripping wings abut at their lower ends against the top of the dial, and are held in that position until the tension on the spring 273 is relieved. Should the box X$^2$ for any reason adhere to the lower end of the plunger 262 as the latter is withdrawn from the dial opening, it will encounter the diametrically-opposite wings 265 which will hold the box within the opening while the plunger continues to ascend. When the plunger is in its raised position, the lower ends of the stripping wings are substantially flush with the lower end of the plunger. By this simple and effective means, I obviate all danger of any box adhering to the patch plunger.

*General operation.*—In the foregoing description of the various mechanisms of my machine, the operations of the different mechanisms have been described more or less independently of each other so as to avoid confusion. With the construction and operation of those mechanisms in mind, it will be easy to understand the general operation of the machine from the moment that the boxes and covers are placed on the separating disks of the box and cover-feeding mechanisms until the sealed boxes are delivered to the conveying belt. I have so far purposely omitted a description of the banding mechanism because this mechanism is rather complicated in its construction and operation and it has been necessary to show the same in separate views, a detailed description of which will be taken up under the next heading.

Figure 8:
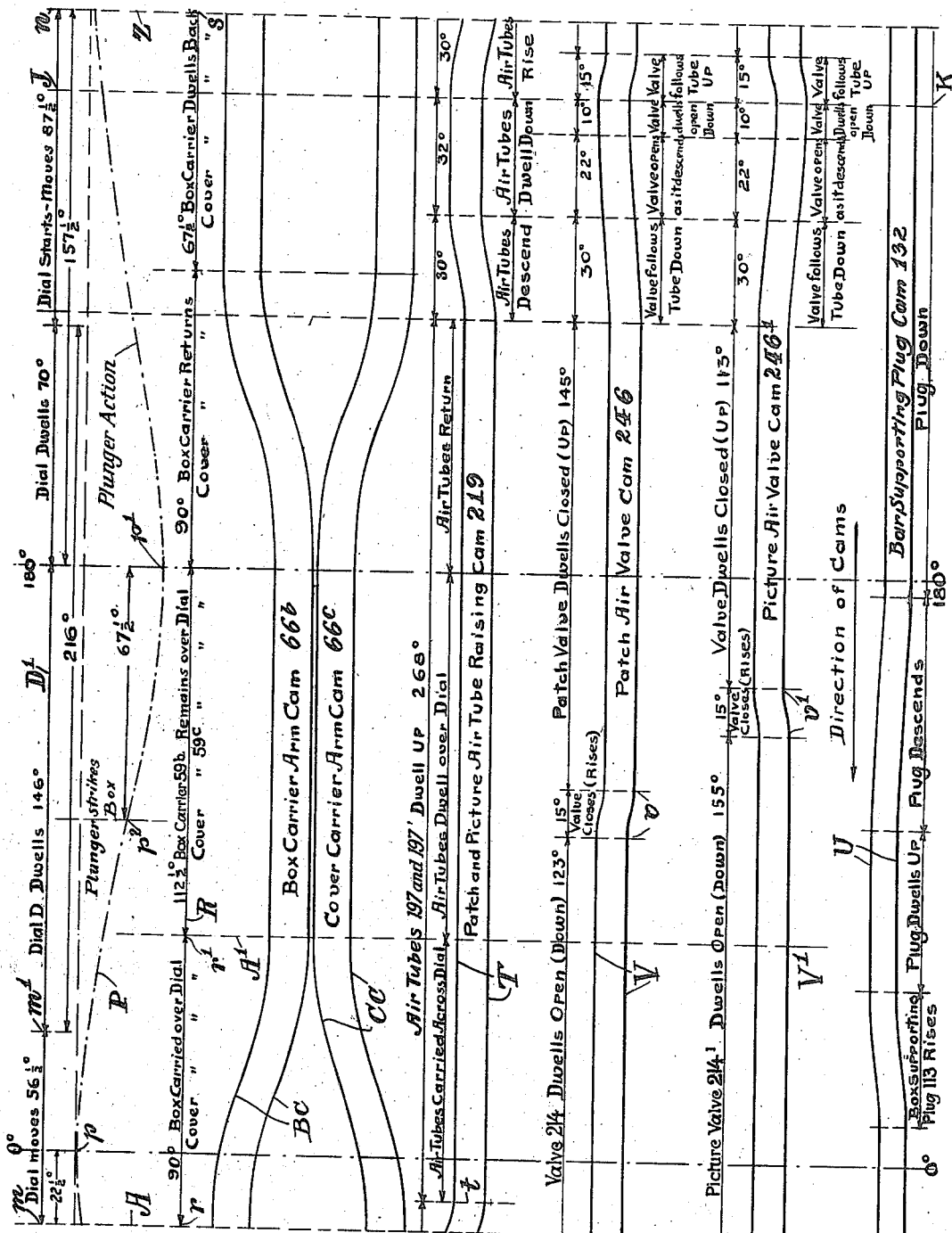
Fig. 8 shows in diagrammatic form a continuous curve development of various cams mounted on the main driving shaft to impart predetermined movements to the mechanisms connected therewith.

In following up the different stages of operation of my machine, I will make special reference to Fig. 8 which shows diagrammatically the movements of the different parts relatively to each other. In this figure the distance between the vertical end lines A and Z, represents one revolution of the main power shaft 30. The straight line D' running from the point $m$ to the point $n$ represents diagrammatically one complete revolution of the dial D. The wave line P represents the vertical movement of the plunger mechanism during one complete revolution of the power shaft. The point $p$ which is on the vertical zero line 0°, represents the highest position of the plunger shaft 109, while the point $p'$ on the vertical line 180° indicates the lowermost position of the same. The distance between the line 0° and 180° represents one-half revolution of the power shaft. The straight line R running from the point $r$ on the end line A to the point $s$ on the end line Z represents the movements of the box carrier arm 59$^b$ and the cover carrier arm 59$^c$ during one complete revolution of the power shaft 30. The parallel lines BC represent a continuous curve development of the box carrier arm cam 66$^b$, while the parallel lines CC represent a continuous curve development of the cover carrier arm cam 66$^c$. The parallel lines T represent a continuous curved development of the cam 219 which controls the vertical movement of the air tubes 197 and 197'. The parallel lines V and V' represent, respectively, continuous curve developments of the patch and picture air valve cams 246 and 246'. The parallel lines U indicate a continuous curve development of the cam 132 which controls the operation of the box-supporting plug 113.

The vertical lines in Fig. 8 indicate time intervals, and the relative positions of the different moving parts at any given moment may be determined by simply following the vertical line representing that moment of time. It should be understood that the cam developments of Fig. 8 do not represent the relative fixed positions of the cams on the power shaft, but they represent the relative positions of the cams with reference to any given time interval line. Thus in Fig. 8, the cam developments T, V, and V' are shown shifted 90° toward the left (the direction of rotation of the cams as viewed in Fig. 8) with reference to the cam developments BC, CC and U, in order to show the operative effects of all of the cams on any given time interval line. The reason for this 90° displacement is apparent when it is considered that the cams $66^b$, $66^c$ and 132 are engaged by their respective rollers at points which are displaced 90° with respect to the points of engagement of the rollers working in the cam grooves of cams 219, 246 and 246'.

As an illustration of how the vertical time interval lines of Fig. 8 serve to indicate the various positions of the moving parts at any given moment, let us refer to the zero line 0°. This line represents the moment when the plunger mechanism is in its uppermost position, as indicated by the point $p$. At that interval the dial is moving, as may be seen from the dial line D'; the box carrier arm $59^b$ and cover carrier arm $59^c$ are being rocked toward the dial, as shown by the line R; the carrier arms of the air tubes 197 and 197' are being carried across the dial, as shown by the cam development T; the patch and picture air valves are in lowered or open position, as indicated in the developments V and V' respectively; and the box-supporting plug 113 is in down position, as indicated by the cam development U.

With the foregoing preliminary explanation of Fig. 8, let us follow the various stages of operation of my machine. The relative positions of the cam-controlled parts as shown in Figs. 1 to 7 inclusive are indicated by the time interval line JK toward the right of Fig. 8. At that moment, the dial is moving in a counter clockwise direction; the plunger shaft 109 is about to reach its upper limit of movement, as shown by the position of the crank pin 145 in Figs. 6 and 7; the box carrier arm $59^b$ and the cover carrier arm $59^c$ dwell back, as shown in Fig. 1; the patch and picture air tubes 197 and 197' dwell down over their respective magazines, but are about to rise; the air valves in the tubes 197 and 197' dwell down in open position but are about to follow their respective tubes up; and the box-supporting plug 113 is in down position. When the main power shaft 30 in its rotatiton reaches the position represented by the end line A in Fig. 8, the box and cover carrier arms $59^b$ and $59^c$ begin to move toward the dial. The air tubes 197 and 197' are at that moment still in their raised position over the patch and picture magazines, but at the point $t$ the cam 219 begins to rock the tubes toward the dial; the patch and picture air valves being open and the box-supporting plug still in down position. The motion of the dial ceases at the point $m'$, before the box and cover carrier arms have reached their position over the dial. At the point $r'$, the box and cover carrier arms and the air tubes come to rest over the dial at the same time, as represented by the line A' in Fig. 8, which is shortly after the dial has come to rest. In the meantime the box-supporting plug 113 has risen into the alined opening in the dial, so that when the box carrier arm $59^b$ arrives in position over the now stationary dial, the plug 113 is in position to receive the empty box. The plungers carried by the spider arms at the top of the plunger shaft 109 strike the boxes at the point $p^2$, which is after the box and cover carrier arms and the air tube arms have come to rest over the dial. Just as the patch and picture plungers strike the patch and picture adhering to the associated air tube arms, the patch and picture air valves close so as to shut off the exhaust, as indicated at $v$ and $v'$ in Fig. 8. The reason why the closing portions $v$ and $v'$ of the cams 246 and 246' are shown displaced in Fig. 8 is because the patch plunger is longer than the picture plunger, as previously explained, and therefore engages its patch before the picture plunger engages the picture on the arm 198'. As the material-feeding slide 90 is operated from the shaft $60^b$, the same as the box-carrier arm $59^b$, the material pushed out of the magazine is deposited on the supporting blades 103 at the same time that the empty box is deposited on the plug 113. Also, at the same time, the cover is held in alinement over the packed box beneath, and the patch and picture are held over the boxes in the dial openings $2^m$ and $2^n$—all as shown in Fig. 9. When, therefore, the plunger arms descend, the following operations occur simultaneously: The empty box is pushed into its dial opening by the plunger $111^a$; the patch is stripped off the air tube arm 198 by the patch plunger $111^b$ and carried to the bottom of the empty box in the opening $2^m$; the plunger $111^c$ releases the fed material from the blades 103 and deposits the same in the empty box over the patch previously fed into it; the picture plunger $111^d$ deposits a picture into the packed box in the opening 2ⁿ; the cover plunger 111ᵉ forces the cover onto the packed box in the opening 2ᶜ; and the plunger 111ᶠ discharges the sealed box out of the discharge opening 2ᶠ.

The above operations are repeated over and over again as the power shaft 30 continues to revolve, and all that the attendant has to do is to see that the machine is kept supplied with empty boxes, covers, patches, pictures and the material to be packed into the boxes. It will be apparent that the operations of feeding the patches and pictures are subsidiary or auxiliary to the main operations of feeding, packing and sealing the boxes. In cases where the patches and pictures are not required or desired, the two blank feeding mechanisms would be omitted or disconnected from the power shaft.

*Banding mechanism.*—The banding mechanism of my machine is shown in all its details in Figs. 31 to 48 inclusive. In Fig. 1, the mechanism is diagrammatically indicated by the dotted rectangle BM to show the location of the mechanism with respect to the assembling dial. This mechanism has been omitted from Figs. 3, 7 and 9 for lack of space and also for the reason that the details would have appeared so small as to be scarcely distinguishable. As previously stated, the purpose of my new and improved banding mechanism is to apply automatically a band of paper across the bottom and up the sides of a sealed box, as the latter is discharged from the dial by the discharge plunger 111ᶠ.

Referring now to the details of construction of the banding mechanism, it will be seen from Fig. 31 that the paper band 277 which is intermittently advanced into banding position is carried on a spool 278 which is rotatably mounted on the pin 279 extending from the bracket arm 279ᵃ secured to the side of the machine bed. From the spool 278 the paper band passes between a pair of feed rolls 280 and 281 made preferably of hardened and ground steel. The upper feed roll 280 is fixed upon the shaft 282 journaled in bearings 283 and 284 carried at the upper end of a pair of upright standards 285 and 286, as best shown in Fig. 34. The lower feed roll 281 is fixed upon the shaft 287 journaled in bearings 288 and 289 carried by the standards 285 and 286. At the outer end of the shaft 282 is fixed the gear wheel 290 which is constantly in mesh with the gear wheel 291 rigidly mounted on the outer end of the lower shaft 287. On the shaft 287 is rotatably mounted the disk 292 having a crank pin 293 on which is pivoted the upper end of the link 294. The crank disk 292 also has a pin 295 on which is pivoted the spring case 296 arranged to bear spring-pressed plunger 297 arranged to bear against the rear end of the pawl 298 pivoted on the stud 299 of the crank disk. A ratchet wheel 300 is fixed upon the shaft 287 adjacent the crank disk 292 and so arranged that the free end of the pawl 298 bears against the periphery of the ratchet and engages the teeth 301 thereof. This is clearly shown in Figs. 31 and 35. The lower end of the link 294 is pivoted on the crank pin 302 carried by the disk 303 which is fixed upon the outer end of the shaft 304 journaled in the machine bed. As seen from Fig. 34, the shaft 304 extends into the interior of the machine bed and is at its inner end provided with a worm gear 305 which is constantly in mesh with the worm gear 306 fixed at one end of the shaft 307. The other end of the shaft 307, which is journaled in a pair of brackets 308 and 309 extending from the inner wall of the machine bed (see Figs. 3 and 31), is provided with a worm gear 310 which is constantly in mesh with the horizontal worm gear 311 fixed upon the vertical connecting shaft 20ᵃ. It will be remembered that shaft 20ᵃ is rotated from the shaft 22 through the gears 21 and 20, and that shaft 22 is in turn driven from the main power shaft 30. As the shaft 20ᵃ is rotated, the crank disk 303 is also rotated by the connections just described. The continuous rotation of the disk 303 moves the link 294 up and down so that the crank disk 292 is oscillated back and forth. When the link 294 is raised, the crank disk 292 is rotated in a counter clockwise direction (as viewed in Fig. 35) and the pawl 298 rides over the teeth of the ratchet 300. The length of the stroke of the link 294 is such that at each upward movement of the link the pawl 298 is moved from one tooth to the other. When the link 294 is lowered, the crank disk 292 is given a quarter of a revolution in a clockwise direction, and the pawl 298 carries the ratchet 300 along with the disk 292, whereby the shaft 287 and the feeding disk 281 are given a quarter revolution. As the shaft 282 is connected to the shaft 287 through the gears 291 and 290, the upper feed disk 281 is rotated simultaneously with the lower feed disk 281, but in an opposite direction, so that a predetermined length of paper band is fed forwardly by the feed disks during each revolution of the disk 303. The shaft 282 is vertically adjustable to raise the upper feed roll 280 out of contact with the lower feed roll when it is desired to stop the feeding of the paper. Fig. 47 shows how the shaft 282 is mounted in adjustable bearing blocks 312 which are slidably mounted in recesses 313 in the standards 285 and 286. Only one of these bearing blocks is shown in Fig. 47, but the other bearing block mounted in the standard 285 is identical with the one shown. The bearing blocks 312 are held in a downward position in the recesses 313 by the springs 314 in the tubular housings 315 secured to the top of the standards 285 and 286. Screws 316 may be provided at the top of the housings 315 to adjust the tension of the springs 314. Each bearing block 312 is provided with a downwardly-extending pin 317 extending through an opening 318 in the bearing standard. Each of the standards 285 and 286 is provided with a transverse opening 319 into which the lower end of the pin 317 projects. The standards 285 and 286 are on their inner sides provided with bushings 320 in alinement with the openings 319 and adapted to pivotally support the arms 321 which are connected together at their outer ends by the cross-piece 322. The inner ends of the arms 321 are each provided with an eccentric pin 323 arranged to extend into the openings 319 and to engage the lower end of the pins 317 on the bearing blocks 312. This is best shown in Fig. 47. It will therefore be clear that when the arms 321 are rocked downwardly, the eccentric pins 323 move upwardly and raise the shaft 282 and with it the upper feed roll 280. The separation of the feed rolls at once stops the feeding of the paper band 277. Any suitable means may be provided for holding the arms 321 in lowered position.

The bearing standards 285 and 286 are a part of a framework which is as a whole indicated by F in Fig. 31 and which is rigidly fixed to the machine bed by bolts 324. The framework F is provided with a horizontal guiding shelf 325 arranged to guide the paper band between the feed rolls 280 and 281. As best shown in Fig. 45, the guide shelf 325 is provided with a slot 326 through which the lower feed roll 281 extends into engagement with the upper feed roll 280. The guide shelf is also provided with a longitudinal groove 327 adapted to receive the paper band. From the guide shelf 325 the paper band passes through the opening 328 in the cutter-head 329 which comprises a base portion 330 and a top portion 331 which is secured to the base portion by means of screw bolts 332. It is in the top 331 that the opening 328 is provided. This opening is preferably convergent in the direction of travel of the paper band so as to insure the guiding of the band from the guide shelf 325 to the cutter-head 329. In the upwardly-tapering groove 333 in the base-member 329 of the cutter-head is secured the knife 334 by means of a pair of binder bolts 335 having engaging heads 336. It will be clear from Fig. 49 that when the bolts 335 are tightened by means of the nuts 337, the knife 334 is rigidly clamped between the heads 336 and the opposite side of the groove 333. The knife 334 over which the paper band travels through the cutter head projects slightly beyond the cutter-head, as indicated at 334$^a$ in Fig. 46 and terminates in a cutting edge adapted to coöperate with the stationary plate 338 to cut the band when the cutter-head is raised. The base portion 330 of the cutter-head 329 is secured to or formed integral with the holder 339 which is at its lower end pivoted to one end of the cam lever 340 by the pin 341. At its other end the cam lever 340 is pivoted on the pin or stud 342 carried by the supporting framework or casting F. The holder 339 is guided in its vertical movements between the walls 343 and 344 of the casting F. The cam lever 340 carries a roller 345 arranged to operate in the cam groove 346 formed in the inner face of the disk 303. As previously stated, the disk 303 is fixed upon one end of the shaft 304 which is adapted to be continuously rotated from the vertical shaft 20$^a$. The cam groove 346 has an operating portion 346$^a$ adapted to throw the lever 340 and the connected cutter holder 339 upwardly to elevate the knife 334 into cutting position. The cutter-head 329 is normally in the position shown in Fig. 45 so that the paper band may pass freely through the opening 328 on to the banding slide 347 which is slidably mounted in the channel $f^1$ of the bed plate $f^2$, fixed upon the bracket 350 of the casting F. The details of construction of this slide are best shown in Figs. 38, 39 and 40. As seen from these figures the slide 347 is at its forward end provided with a head indicated as a whole by 348 and having the box-receiving opening 349 into which the sealed boxes are forced by the discharging plunger 111$^t$. As the paper band is advanced, it passes through the opening 328 in the cutter-head substantially midway across the opening 349, as shown at 227$^a$ in Figs. 36, 40, 45 and 46. The slide 347 is provided with a longitudinal air passage 351 and a vertical air passage 352 in the head 348. The passage 352 communicates with the transverse passage 353 in the head, the passage 353 being at its ends connected with the longitudinal passages 354 and 355 formed along the sides of the slide-head. The passages 354 and 355 communicate with the narrow passageways 356 and 357 respectively, which extend to the upper surface of the slide-head 348 and are open at their upper ends. As seen from Figs. 36 and 39, the passages 356 and 357 terminate on either side of the box-receiving opening 349 at diametrically-opposite points, so that the paper band lies directly over these air passages. The rear ends of the passages 354 and 355 are closed by suitable screw plugs 358. A cover 359 is fixed upon the head 348 by screws 360, or otherwise, to close the vertical passage 352, as shown in Figs. 38 and 39. To the rear end of the air passage 351 is screwed the elbow pipe 361 which is connected to the flexible tube 362. As seen from Figs. 31 and 33, the tube 362 is at its other end connected to the pipe extension 363 on the bracket 364 which is secured to the side of the machine bed by screws or bolts 365. A pipe 366 adapted to be connected to a source of exhaust, is connected to the bracket 364 and communicates with the opening 367 formed in the head 368 of the bracket 364. The head 368 is provided with a recess or chamber 369 in which operates the valve 370. The pipe extension 363 communicates with the chamber 369 through the restricted opening 371, while the pipe 366 communicates with the chamber 369 through the opening 367. The valve 370 has a stem 272 which extends through an opening 373 formed in the bracket head 368 in alinement with the chamber 369. The outer end of the chamber 369 is closed by the screw plug 373. The projecting end of the valve stem 372 is provided with a pair of spaced collars 374 between which operate the rollers 375 carried by the yoke arms 376 of the lever 377. At the point 378 the lever 377 is pivoted to the bracket 379 fixed on the side of the machine bed. To the lower end of the lever 377 is pivoted the outer end of the cam arm 380 which extends through an opening 381 into the interior of the machine bed, as best shown in Fig. 32. At its inner end the cam lever 380 terminates in yoke arms 382 which are arranged upon opposite sides of the guide block 383 rotatably mounted on the power shaft 30. The guide block 383 serves as a support for the yoke arms 382 and at the same time permits horizontal movement of the cam arm 380. A cam wheel 384 is fixed upon the power shaft 30 adjacent to the cam lever and is provided with a cam groove 385 in which operates the cam roller 386 carried by the arm 380. The cam groove 385 has two diametrically-opposite working portions, one of which is shown at 387 in Fig. 32. These working portions connect the concentric portions 388 and 389. It will be clear from Fig. 32 that as long as the roller 386 operates in the inner concentric portion 389, the valve 370 is in closed position. When, however, the roller passes from the inner concentric portion 389 of the cam groove 385 to the outer concentric portion 388 through the operative portion 387, the arm 380 is shifted toward the right and rocks the lever 377 in a counter clockwise direction, as viewed in Fig. 32. This motion of the lever 337 slides the valve 370 into open position, so as to establish communication between the pipe 366 and the flexible tube 362 through the opening 367, the recess 369, the restricted passage 371 and the pipe extension 363. At each revolution of the power shaft 30, the valve 370 is opened and closed once. When the valve 370 is open, the passages 356 and 357 are connected with the source of exhaust and the band of paper 227$^a$ is held across the opening 349 by suction. As will be presently explained, this suction is automatically cut off when the discharging plunger 111$^f$ forces the sealed box from the dial into the opening 349 where the banding takes place.

The slidehead 348 is provided with a pair of diametrically-opposite recesses 390 in which are pivotally supported the pressure shoes 391 by means of pins 392. Suitable spring means is provided for holding the lower end of the shoes slightly inwardly. The specific form of spring means which I have shown in the drawings for the sake of illustration, comprises a coil spring 393 surrounding the rod 394 in the chamber 395. The inner end of the rod 394 is pivoted to the pressure shoe at 396. The rod 394 passes through an opening in the head 397 of the screw plug 398 which is screwed into the chamber 395, as shown in Figs. 40 and 46. The outer end of the rods 394 may be provided with adjustable nuts 399 to adjust the tension of the springs 393. It will be clear from Fig. 40 that when the discharging plunger 111$^f$ forces the sealed box X$^4$ downwardly into the opening 349, the two end portions of the band 227$^a$ are automatically bent upwardly against the sides of the box. These upwardly-bent portions are yieldably engaged by the pressure shoes 391, whereby the band is held taut against the box. The engaging surface of the pressure shoes 391 are concave as shown in Fig. 39, so as to conform to the cylindrical outline of the box. When the discharging plunger 111$^f$, which may also be termed the banding plunger, has reached the limit of its downward movement, the box is in the position shown at X$^5$ in Fig. 40 and is held in this position between the rollers 400 journaled on pins 401 in the slots 402 of the slidehead 348. The rollers 400 are made of yieldable material, such as rubber, and are concave in their periphery so as to conform to the shape of the box. The banded box is held between the rollers until the banding plunger 111$^f$ forces the next succeeding box into the same position, so that each box, as it is forced into position between the rollers 400, automatically forces the preceding box out of that position. The released box falls on to a suitable conveyer belt whereby it is carried to a suitable receptacle. The action of one box forcing the other out of the banding slide is illustrated in Fig. 44 in which X$^6$ indicates the banded box which has just been forced from between the rollers 400 by the box X$^5$. The band around the box X$^6$ is indicated by 227$^b$. I have not thought it necessary to show a conveyer belt in Fig. 44 because it will be apparent to those skilled in the art that such a belt can be easily arranged to extend into the space S to receive the released boxes. The journal pins 401 of the rollers 400 are carried on the rear end of the arms 403 pivoted on vertical pins 404 carried by the extensions 405 of the slide-head 348. An extending coil spring 406 arranged between the free ends of the arms 403 presses the rollers 400 against the banded sides of the box $X^5$. As will be presently explained, before the paper band $227^a$ is forced around the sealed box, a suitable adhesive is automatically applied to the ends of the strip. The pressure shoes 391 not only insure tautness of the band around the box, but they press the glued ends of the paper band against the sides of the box so as to facilitate the sticking of the band to the box. Furthermore, during the interval that the banded box $X^5$ is held between the yieldable rollers 400, the adhesive is given a chance to dry, if not fully, at least partially. If desired, a suitable drying device may be arranged to hasten the drying of the adhesive while the box is held between the rollers 400.

The above-described operation by which the sealed boxes are automatically banded as they are forced from the assembling dial into the banding opening 349 of the slide 347, takes place while the slide 347 is in its forward or banding position. Just after the ascending plunger $111^f$ has cleared the dial, the banding slide 347 recedes, and advances again into banding position when the plunger mechanism descends. The slide reaches banding position just before the plunger $111^f$ strikes the sealed box $X^4$. The connections for producing this back and forth movement of the slide are as follows: At its rear end the slide 347 carries a downwardly-projecting pin 407 on which is pivoted one end of the link 408. The inner end of the link 408 is pivoted on the wrist pin 409 extending upwardly on the crank disk 410 which is arranged to rotate in the chamber 411 of the bracket 412 suitably secured to the machine bed M. The bracket 412 is provided with a bushing 413 through which extends the shaft 414. On the upper end of the shaft is rigidly mounted the crank disk 410, while to the lower end thereof is secured the bevel gear 415. An arm 416 is at its lower end pivoted on the pin 417 extending from the side of the machine bed, and is at its upper end provided with the segmental gear rack 418 which is constantly in mesh with the bevel gear 415. A connecting rod 419 is at one end pivoted to the rack arm 416 by the pin or stud 420, and at its other end to the upper end of the arm 421 by the pin 422. The arm 421 is fixed to one end of the stud 423 journaled in the bracket 424 extending from the end wall of the machine bed. To the other end of the stud 423 is fixed the arm 425 which carries at its lower end a roller 426 arranged to operate in the cam groove 427 of the cam 428 fixed upon the power shaft 30, as clearly shown in Fig. 31. The arm 425 is shown in dotted lines in Fig. 31 because it is at the far side of the cam wheel 428. As the cam 428 rotates, the arms 421 and 425 oscillate back and forth as one member and cause simultaneous operation of the segmental rack 418. The movement of the rack 418 is communicated to the slide 347 through connections previously described—namely, bevel gear 415, shaft 414, crank disk 410 and link 408. When the gear rack 418 is rotated in a clockwise direction (as viewed in Fig. 31) the slide 347 is advanced into banding position. When the rack moves the other way, the banding slide is withdrawn. The movements of the banding slide are so timed by the cam 428 that the slide reaches banding position just before the banding plunger $111^f$ strikes the box $X^4$, which occurs at the time when the assembling dial is at rest. As soon as the plunger $111^f$ has cleared the assembling dial D during the upward movement of the plunger mechanism through the connections previously described, the banding slide begins its return movement which, in the particular embodiment of my invention illustrated in the drawings, is completed approximately during one-third revolution of the main power shaft. During this return movement of the banding slide 347, the air valve 370 remains closed but is automatically opened about the time the carrier reaches the limit of its return movement. The valve remains open until the plunger $111^f$ begins to force the box $X^4$ downwardly. The intermittent movements of the paper feeding rolls 280 and 281 are so timed that during the advance movement of the banding slide the feed stops, but starts again shortly before the slide begins its return movement and continues until just before the slide arrives in withdrawn position. As soon as the paper band has been fed into banding position over the opening 349 in the slidehead 348, the cutter-head 329 rises to cut off the portion $227^a$ of the band fed on to the slide 347.

On the top plate 1 of the machine bed is fixed a suitable bracket 429 provided on top with a guide plate 430 in which is slidably mounted the slide 431. At its front end the slide 431 has an upright extension 432 to which is secured the box-supporting plate 433 by means of screws 434 or otherwise. An expansion spring 435 bears at one end against the lug 436 of the framework 429 and at its other end against the slide 431, to normally hold the same in the position shown in Figs. 37 and 38. To prevent buckling of the spring during the rearward movement of the slide 431, the spring may be housed in the horizontal recess 437 formed in the slide, as shown in Fig. 44. In its normal position, the plate 433 extends in the space $d^5$ between the segmental supporting plates $d^1$ and $d^2$, previously referred to. When in this, its normal position, the plate 433 is adapted to support the boxes in the discharge opening $2^f$, the position of which is shown in Fig. 9. The plate 433 is thus in effect a continuation of the box-supporting segment $d^2$, and as the dial D is rotated, the sealed boxes slide from the segmental plate $d^2$ to the plate 433. When the dial stops and a sealed box has been brought to rest on the temporary supporting plate 433, the banding slide 347 is advancing toward the dial. When the lug 438 formed on the head of the slide 347 strikes the upright extension 432 of the slide 431, the box-supporting plate 433 is forced inwardly and the opening 349 of the slide is brought into alinement with the discharge opening $2^f$ in the dial, as clearly shown in Fig. 44. In this position of the parts, before the plunger $111^f$ strikes the sealed box $X^5$, the box rests upon the paper band $227^a$ over the opening 349. At this time the air valve 370 is open and the band is retained in position by the exhaust, as previously described. The box-supporting plate 433 is provided with a recess 439 to clear the box entirely of the plate 433 when the banding slide 347 is in advanced position.

There remains to be described the automatic gluing attachment of my banding mechanism. A paste pan 440 is rigidly mounted on the bed plate $F^2$, as best shown in Fig. 35. The framework of the paste pan is provided with footpieces 441 and 442 which rest on the bed plate $f^2$ and through which pass suitable fastening devices. The containing chamber of the paste pan is substantially semi-cylindrical in form, as best shown in Fig. 38. Above the footpiece 442 of the paste pan is provided a bearing 443 which is in alinement with the bearing 444 provided at the upper end of the bearing bracket 445 suitably secured to the supporting members $f^1$ and $f^2$, previously referred to. In the journal bearings 443 and 444 is rotatably mounted the shaft 446. To the inner end of this shaft is fixed the pinion 447 and near the other end thereof, adjacent the bearing 444, is fixed the disk 448. Between the bearing 443 and the disk 448 is rotatably mounted the gear 449 provided with a ratchet wheel 450, as best shown in Figs. 42 and 43. The gear wheel 445 and the ratchet wheel 450 may conveniently be cast in one piece. The disk 448 carries a pin 451 on which is pivoted the tubular case 452 containing the spring-pressed plunger 453. The disk 448 is also provided with the pin 454 on which is pivoted the pawl 455. The plunger 453 is arranged to bear against the rear end of the pawl to force the forward end thereof into engagement with the teeth 456 of the ratchet wheel 450. It will be clear from Fig. 42 that when the shaft 446 rotates in a clockwise direction, the pawl 455 rides over the teeth of the ratchet wheel without causing motion thereof. However, when the shaft is rotated in the reverse direction, the pawl 455 engages in the teeth 456 and thereby connects the gear 449 to rotate in unison with the shaft 446. On the banding slide 347 is secured the rack 457 so as to constantly mesh with the pinion 447. When the slide moves forwardly into banding position, the pinion 447 and with it the shaft 446 and the pawl disk 448, rotate in the direction indicated by the arrows in Figs. 35, 41 and 43, thereby causing rotation of the gear 449. When the banding slide returns, the shaft 446 is rotated in the opposite direction and the gear 449 remains stationary. The rotation of the gear 449 in one direction only is to cause movement of the pasting arms in one direction only, as will be presently explained. The sidewalls of the paste pan 440 are at the top provided with alined bearings 459 in which is journaled the shaft 460 carrying the paste wheels 461. As shown in Figs. 38 and 44, these wheels work closely over the cylindrical bottom of the paste chamber, so as to dip deeply into the paste 462 in the pan. The shaft 460 extends beyond the outer bearing 459 and carries the large gear wheel 463 which is at one side in mesh with the intermediate gear 464 journaled in the bearing 465 on the paste pan. At its lower end the gear 464 is in mesh with the gear 448 which, as previously stated, is rotatably mounted on the shaft 446. Upon the bearing portions 459 are clamped the L-shaped arms 466 by means of bolts 467. These L-shaped arms are at their elbows provided with journal bearings 468 in which is rotatably mounted the shaft 469. At the outer end of the shaft is fixed the small gear 470 which is in mesh with the large gear 463. On the shaft 469 are also fixed small disks or wheels 471 which are continually in contact with the large paste pan wheels 461. In the lower ends of the L-shaped arms 466 is journaled the shaft 472 on which are fixed the paste arms 473 in alinement with the wheels 471. These arms are of such length as to contact with the peripheries of the alined wheels 471 to take therefrom a small quantity of adhesive. The outer ends of the arms 473 are curved so as to ride close to the disks 471. The shaft 472 extends at its outer end beyond its bearing and has fixed thereon the gear 474 which is constantly in mesh with the gear 470. The shafts 469 and 472 therefore rotate in opposite directions, as indicated by the arrows in Fig. 38.

The operation of the pasting attachment of my banding mechanism will now be clearly understood and is as follows: During the advance movement of the banding slide 347, the ratchet gear 449 is revolved in a clockwise direction as viewed in Fig. 38. This produces the clockwise rotation of the paste pan wheels 461 through the medium of the gears 465 and 463. At the same time, the gear 463 rotates the gear 470 counter clockwise and with it the shaft 469 and the disks 471. The gear 470 drives the connected gear 474 and produces rotation of the paste arms 473 on the shaft 472 in a clockwise direction. As the disks 461 revolve through the mass of paste 462, some of the past adheres to the disks and is carried upwardly against the disks 471. A sufficient quantity of the paste is removed from the large disks 461 by the small disks or wheels 471. As the arms 473 move closely by the disks 471 they remove a small quantity of the adhesive which is then deposited on the band 227ᵃ as the latter is held over the banding opening 349. The points at which the arms 473 touch the band are preferably in alinement with or near the exhaust passages 356 and 357. Fig. 41 shows the arms 473 in pasting position. The movement of the paste arms is so timed relative to the movement of the banding slide 347, that the paste arms and the paper band come together shortly before the slide reaches the limit of its forward movement. Fig. 38 shows the relative positions of the paste arms and the banding slide when the latter dwells back. As the banding slide advances (toward the left in Fig. 38) the arms 473 rotate clockwise and when the band 227ᵃ is in vertical alinement with the shaft 472, the paste arms pass through vertical positions and their lower ends wipe the paste on the band. This is shown in Fig. 1. When the banding slide 347 has reached the limit of its advanced movement, the arms 473 occupy the position shown in Fig. 44 which is 180° from the position of the arms shown in Fig. 38. In other words, during each advance movement of the banding slide 347, the paste arms make half a revolution. The operation of the different parts of my new and improved banding mechanism will be clearly understood from the foregoing and need not therefore be repeated here.

I have also provided a paste gage for regulating the quantity of paste which the wheels 461 carry against the wheels 471. As best shown in Fig. 38, this gage comprises a rod 475 provided with a pair of slots or grooves 476 into which the disks 461 extend. The gage rod 475 is rotatably mounted in the sides of the paste pan and is at one end provided with a knurled head 477 by means of which the rod may be adjusted. It will be clear from Fig. 38 that by adjusting the gage rod 475, the edges of the slots 476 can be moved toward or away from the paste wheels 461, so that more or less of the adhering paste may be scraped off the wheels.

While I have herein illustrated and described a specific form of machine embodying the different features and characteristics of my invention, I will have it understood that changes and modifications may be made in many of the details without departing from the scope of the invention as defined in the appended claims. Furthermore, the relative proportions of parts may be changed to adapt the machine to various uses.

Having thus described my invention, what I claim as new and desire to secure by Letters Patent of the United States, is:

1. In an automatic packing machine, the combination of a rotatable assembling dial adapted to receive the boxes for packing, rotary mechanism at one side of said dial for horizontally feeding empty boxes to the same, mechanism for feeding the material to the empty boxes on said dial, rotary mechanism on the opposite side of said dial for horizontally feeding the covers to the packed boxes, and means for forcing said covers in place on the boxes.

2. In an automatic packing machine, the combination of a rotatable assembling dial adapted to receive the boxes for packing, a rotatable box-feeding disk at one side of said dial, a rotatable cover-feeding disk at the opposite side of said dial, means associated with each of said disks for feeding the boxes or covers from the disk to the dial, mechanism for feeding the material to the empty boxes on said dial, and plunger means for placing the covers on the packed boxes.

3. In an automatic packing machine, the combination of a rotatable assembling dial adapted to receive the boxes for packing, a rotatable box-feeding disk at one side of said dial, a rotatable cover-feeding disk at the opposite side of said dial, a pivoted arm associated with each of said disks and adapted to move the boxes or covers from the disk to the dial, mechanism for feeding the material to the empty boxes on said dial, and plunger means for placing the covers on the packed boxes.

4. In an automatic packing machine, the combination of a rotatable assembling dial adapted to receive the boxes for packing, mechanism at one side of said dial for feeding empty boxes to the same, mechanism for feeding the material to the empty boxes on said dial, mechanism on the opposite side of said dial for feeding the covers to the packed boxes, and plunger mechanism adapted to reciprocate vertically over said dial to engage the boxes and covers fed to the dial and to move the same into proper position.

5. In an automatic packing machine, the combination of a rotatable assembling dial adapted to receive the boxes for packing, mechanism for feeding empty boxes to said dial, mechanism for feeding the box covers to said dial, a vertical magazine associated with said dial to hold the material to be packed into the boxes, said magazine being arranged out of alinement with the box in feeding position on said dial, means for horizontally conveying a predetermined quantity of said material from the magazine into feeding position over the dial, means for temporarily holding the material in said feeding position, and mechanism for actuating said holding means to release the fed material and allow the same to drop into the empty box underneath.

6. In an automatic packing machine, the combination of a rotatable assembling dial adapted to receive the boxes for packing, mechanism for feeding empty boxes to said dial, mechanism for feeding the box covers to said dial, a vertical magazine associated with said dial to hold the material to be packed into the boxes, means for conveying a predetermined quantity of said material from the magazine into the feeding position over the dial, means for temporarily holding the material in said feeding position, plunger mechanism adapted to reciprocate vertically over said dial to engage the boxes and covers fed to the dial and move the same into proper position, and means on said plunger mechanism to actuate said holding means to release the fed material and allow the same to drop into the empty box underneath.

7. In an automatic packing machine, the combination of a rotatable assembling dial, a rotatable box-feeding disk at one side of said dial in close proximity thereto for feeding the boxes directly to said dial, a rotatable cover-feeding disk similarly arranged at the opposite side of said dial for feeding the covers directly to the boxes on said dial, the axes of rotation of said dial and said disks being approximately in the same vertical plane, and a common driving member for said dial and said disks.

8. In an automatic packing machine, the combination of a rotatable assembling dial provided on its upper surface with pockets near its periphery, a rotatable feeding disk adjacent to said dial, a pivoted arm movable over said disk and said dial to carry the article therefrom over said dial into vertical alinement with one of said pockets, and means independent of the articles for positively actuating said arm at predetermined intervals.

9. In an automatic packing machine, the combination of an intermittently rotatable assembling dial, a continuously rotatable feeding disk, a common driving shaft continuously rotatable, connections between said shaft and said dial for operating the latter intermittently, connections between said shaft and said disk for operating the latter continuously, a device for conveying the articles one by one from said disk to said dial, and means independent of the articles for positively actuating said device intermittently at predetermined intervals.

10. In an automatic packing machine, the combination of an intermittently rotatable assembling dial, a continuously rotatable feeding disk, and an intermittently operable device for conveying the articles one by one from said feeding disk to said dial, said device being arranged when in normal or unoperated position to form a stop for the articles on said feeding disk.

11. In an automatic packing machine, the combination of an intermittently rotatable assembling dial, a continuously rotatable feeding disk, an intermittently operable device for conveying the articles one by one from said feeding disk to said dial, and means on said device adapted to lie in the path of the boxes to form a stop therefor, when said device is in operated position.

12. In an automatic packing machine, the combination with a rotatable assembling dial, of box-feeding mechanism and cover-feeding mechanism associated with said dial upon opposite sides thereof, each of said mechanisms including a rotatable feeding disk having a central opening or recess, an oppositely rotatable separating disk in said opening, means for guiding the covers or boxes from the separating-disk to the feeding-disk in a single feed line or row, and means for conveying the foremost box or cover of said line from the feeding-disk to the assembling dial.

13. In an automatic packing machine, the combination with a rotatable assembling dial, of box-feeding mechanism and cover-feeding mechanism associated with said dial upon opposite sides thereof, each of said mechanisms including a rotatable feeding disk having a central opening or recess, an oppositely rotatable separating disk in said opening, means for guiding the covers or boxes from the separating-disk to the feeding-disk in a single feed line or row, and a pivoted arm for conveying the foremost box or cover of said line from the feeding-disk to the assembling dial.

14. In an automatic packing machine, the combination with a rotatable assembling dial, of box-feeding mechanism and cover-feeding mechanism associated with said dial upon opposite sides thereof, each of said mechanisms including a rotatable feeding disk having a central opening or recess, an oppositely rotatable separating disk in said opening, means for guiding the covers or boxes from the separating-disk to the feeding-disk in a single feed line or row, a pivoted arm for conveying the foremost box or cover of said line from the feeding-disk to the assembling dial, and an extension on said arm adapted to form a positive stop for said feed line of boxes or covers when the arm is in operated position.

15. In an automatic packing machine, the combination with a continuously rotatable assembling dial, of box-feeding mechanism and cover-feeding mechanism associated with said dial upon opposite sides thereof, each of said mechanisms including a continuously rotatable feeding disk having a central opening or recess, a reversely rotatable separating-disk in said opening, means for guiding the boxes or covers from the separating-disk to the feeding-disk in a single feed line or row, and intermittently-operated means for conveying the foremost box or cover of said line from the feeding-disk to the assembling dial.

16. In an automatic packing machine, the combination of a rotatable feeding-disk having a central opening or recess, a separating-disk mounted to rotate in said recess substantially in the same plane as the feeding-disk, means for rotating said disks in opposite directions, and means for guiding the articles thrown outwardly from said separating-disk to said feeding-disk in a single feed line or row.

17. In an automatic packing machine, the combination of a rotatable feeding-disk having a central opening or recess, a separating-disk mounted to rotate in said recess substantially in the same plane as the feeding-disk, means for rotating said disks in opposite directions, means for guiding the articles thrown outwardly from said separating-disk to said feeding-disk in a single feed line or row, and an intermittently-operated member for removing the articles from said feeding-disk.

18. In an automatic packing machine, the combination of a rotatable feeding disk having a central opening or recess, a separating-disk mounted to rotate in said recess substantially in the same plane as the feeding-disk, means for rotating said disks in opposite directions, means for guiding the articles thrown outwardly from said separating-disk to said feeding-disk in a single feed line or row, and an intermittently-operated member arranged to engage normally the foremost article in said line and adapted to convey said article from the feeding-disk.

19. In an automatic packing machine, the combination of a rotatable feeding disk having a central opening or recess, a separating-disk mounted to rotate in said recess substantially in the same plane as the feeding-disk, means for rotating said disks in opposite directions, means for guiding the articles thrown outwardly from said separating disk to said feeding-disk in a single feed line or row, and an intermittently-operated member arranged to engage normally the foremost article in said line and adapted to convey said article from the feeding-disk, said member having a portion which extends across the travel path of said line of articles to form a positive stop therefor, when said member is in operated position.

20. In an automatic packing machine, the combination of a rotatable feeding-disk having a central opening or recess, a separating-disk mounted to rotate in said recess substantially in the same plane as the feeding-disk, and means for rotating said disks in opposite directions, said disks being in communication with each other only through an arc of their circumference.

21. In an automatic packing machine, the combination of a rotatable feeding-disk having a central opening or recess, a separating-disk mounted to rotate in said recess substantially in the same plane as the feeding-disk, a vertical shaft on which said disks are supported, one of said disks being directly connected to said shaft to rotate therewith in the same direction, while the other disk is rotatably mounted on said shaft, and driving connections between disks for rotating said other disk in the opposite direction from the first-mentioned disk.

22. In an automatic packing machine, the combination of a rotatable feeding-disk having a central opening or recess, a separating-disk mounted to rotate in said recess substantially in the same plane as the feeding-disk, a vertical driving shaft arranged in the axis of revolution of said disks, and means for connecting said disks reversely with said shaft to cause simultaneous rotation of said disks in opposite directions at substantially the same speed.

23. In an automatic packing machine, the combination of a rotatable assembling dial, a rotatable feeding-disk, a movable arm for conveying the articles from the feeding-disk to the assembling dial, said arm having a recess at its free end for receiving the article to be fed, and a centralizer extending over said dial and adapted to coöperate with said arm for holding the article in predetermined position over the dial.

24. In an automatic packing machine, the combination of a rotatable feeding-disk having a central opening or recess, a separating-disk mounted to rotate in said recess substantially in the same plane as the feeding-disk, means for rotating said disks in opposite directions, said disks being in communication with each other only through an arc of their circumference, and a substantially radial guide extending across the supporting disk to direct the articles toward the communicating arc.

25. In an automatic packing machine, the combination of an intermittently rotatable assembling dial having means for retaining boxes in spaced relation thereon, rotary box-feeding mechanism at one side of said dial, rotary cover-feeding mechanism at the other side of said dial, material-feeding mechanism arranged to operate substantially midway between said box and cover-feeding mechanisms, a driving shaft, and operative connections running from said shaft to said dial and all of said feeding mechanisms.

26. In an automatic packing machine, the combination of an intermittently rotatable assembling dial having means for retaining boxes in spaced relation thereon, box-feeding mechanism at the other side of said dial, material-feeding mechanism arranged to operate substantially midway between said box and cover-feeding mechanisms, plunger mechanism vertically reciprocable over said dial and carrying three plungers, one for positioning the empty boxes fed to the dial, the second for insuring the proper deposit of the material into the open boxes, and the third for pressing the covers down over the packed boxes, a driving shaft, and operative connections running from said shaft to said dial and all of said feeding mechanisms.

27. In an automatic packing machine, the combination of an intermittently rotatable assembling dial having means for retaining boxes in spaced relation thereon, box-feeding mechanism at one side of said dial, cover-feeding mechanism at the other side of said dial, material-feeding mechanism arranged to operate substantially midway between said box and cover-feeding mechanisms, and banding mechanism associated with said dial opposite said material-feeding mechanism to affix a band to each of the sealed boxes as they are discharged from the dial, said band running across the bottom of the box and up the sides.

28. In an automatic packing machine, the combination of an intermittently rotatable assembling dial having means for retaining boxes in spaced relation thereon, box-feeding mechanism at one side of said dial, cover-feeding mechanism at the other side of said dial, material-feeding mechanism arranged to operate substantially midway between said box and cover-feeding mechanisms, banding mechanism associated with said dial opposite said material-feeding mechanism to affix a band to each of the sealed boxes as they are discharged from the dial, said band running across the bottom of the box and up the sides, and plunger mechanism vertically reciprocable over said dial and carrying four plungers, one for positioning the empty boxes fed to the dial, the second for insuring the proper deposit of the material into the open boxes, the third for pressing the covers down over the sealed boxes, and the fourth for discharging the sealed boxes from the dial into the banding mechanism.

29. In an automatic packing machine, the combination of an intermittently rotatable assembling dial having means for retaining the boxes in spaced relation thereon, box-feeding mechanism on one side of dial, cover-feeding mechanism at the other side of said dial, material-feeding mechanism arranged to operate substantially midway between said box and cover-feeding mechanisms, blank-feeding mechanism arranged to operate between the box-feeding mechanism and the material-feeding mechanism to convey suitable blanks over the empty boxes on the dial, a second blank-feeding mechanism arranged to operate between the feeding points of the material-feeding mechanism and the cover-feeding mechanism to convey suitable blanks over the filled boxes on the dial, and means for stripping said blanks from their respective feeding-mechanisms and depositing them in the boxes on the dial.

30. In an automatic packing machine, the combination of an intermittently rotatable assembling dial having means for retaining boxes in spaced relation thereon, box-feeding mechanism at one side of said dial, cover-feeding mechanism at the other side of said dial, material-feeding mechanism arranged to operate substantially midway between said box and cover-feeding mechanisms, a pair of horizontally movable hollow arms adapted each to be connected with an exhaust for carrying suitable blanks over the dial, one of said arms being arranged to carry blanks over the empty boxes on the dial, while the other arm is arranged to carry blanks over the packed boxes on the dial, and plunger means for stripping said blanks from their respective arms and depositing them into the boxes.

31. In an automatic packing machine, the combination of a movable member for receiving the boxes to be packed, mechanism for feeding boxes to said member, a magazine adapted to contain suitable blanks or disks, a pivoted hollow arm adapted to be connected with an exhaust for carrying the blanks from said magazine to said dial, the free or engaging end of said arm being bent downwardly, a hollow plunger having a side opening to receive the free end of said arm for stripping the blanks therefrom, means for swinging said arm from said magazine over said movable member in vertical alinement with a box, means for moving said plunger downwardly while said arm is held in operated position over said movable member to deposit the blank into the empty box, mechanism for feeding the material to the boxes in which the blanks have been deposited, and mechanism for feeding covers to the packed boxes.

32. In an automatic packing machine, the combination of a movable member for receiving the boxes to be packed, mechanism for feeding boxes to said member, a magazine adapted to contain suitable blanks or disks, a pivoted hollow arm adapted to be connected with an exhaust for carrying the blanks from said magazine to said dial, the free or engaging end of said arm being bent downwardly, a hollow plunger having a side opening to receive the free end of said arm for stripping the blanks therefrom, means for swinging said arm from said magazine over said movable member in vertical alinement with a box, means for moving said plunger downwardly while said arm is held in operated position over said movable member to deposit the blank into the empty box, mechanism for feeding the material to the empty boxes in which the blanks have been deposited, mechanism for feeding the covers to the packed boxes, and mechanism for automatically cutting off said exhaust when the plunger engages the blank carried by said arm.

33. In an automatic packing machine, the combination of a movable member for receiving the boxes to be packed, mechanism for feeding boxes to said member, a magazine adapted to contain suitable blanks or disks, a pivoted hollow arm adapted to be connected with an exhaust for carrying the blanks from said magazine to said dial, the free or engaging end of said arm being bent downwardly, a hollow plunger having a side opening to receive the free end of said arm for stripping the blanks therefrom, means for swinging said arm from said magazine over said movable member in vertical alinement with a box, means for moving said plunger downwardly while said arm is held in operated position over said movable member to deposit the blank into the empty box, mechanism for feeding the material to the empty boxes in which the blanks have been deposited, mechanism for feeding the covers to the packed boxes, and stripping means at the top of said magazine for positively preventing more than one blank from adhering to said arm at one time.

34. In an automatic packing machine, the combination of a horizontally movable member having pockets adapted to receive the boxes to be packed, means for feeding empty boxes to said member, means for conveying a suitable blank to each box on said movable member, a vertically movable plunger for carrying said blank into the box, a stripping device slidably mounted on said plunger for positively preventing the box from adhering to the plunger, mechanism for feeding the material to the empty boxes in which the blanks have been deposited, and mechanism for feeding covers to the packed boxes.

35. In an automatic packing machine, the combination of a horizontally movable member having pockets or openings adapted to receive the boxes to be packed, a plunger arranged to enter said boxes as they come into alinement therewith, a stripping device slidably mounted on said plunger for positively preventing the boxes from adhering to the plunger, mechanism for feeding empty boxes into said pockets or openings, mechanism for feeding the material to the empty boxes on said member, and mechanism for feeding covers to the packed boxes.

36. In an automatic packing machine, the combination of a horizontally movable member having pockets or openings adapted to receive the boxes to be packed, a plunger arranged to enter said boxes as they come into alinement therewith, a stripping device slidably mounted on said plunger for positively preventing the boxes from adhering to the plunger, said device including a pair of diametrically-opposite spring-pressed strippers adapted to engage the top of the adhering box and hold the same within its pocket in said movable member, mechanism for feeding empty boxes into said pockets or openings, mechanism for feeding the material to the empty boxes on said member, and mechanism for feeding covers to the packed boxes.

37. In an automatic packing machine, the combination of a horizontally movable member adapted to receive the boxes to be packed, a stationary magazine associated with said member and adapted to contain the articles in a column for packing into said boxes, an adjustable support for the articles over said member in vertical alinement with a box to be packed, a slide arranged to remove a predetermined quantity of said articles from the magazine and convey the same to said support, said slide when in normal position forming the bottom of said magazine, means for adjusting said support to release the articles and allow the same to drop into the empty box underneath, mechanism for feeding empty boxes to said member, and mechanism for feeding covers to the packed boxes.

38. In an automatic packing machine, the combination of a horizontally movable member adapted to receive the boxes to be packd, a stationary magazine associated with said member and adapted to contain the articles in a column for packing into said boxes, a pair of oppositely swinging spring-pressed levers provided with blades to support the articles over said member in vertical alinement with a box to be packed, a slide arranged to remove the predetermined quantity of said articles from the magazine and convey the same to said supporting blades, said slide when in normal position forming the bottom of said magazine, a vertically reciprocable plunger having means for separating said blades to release the articles which thereupon drop into the empty box underneath, mechanism for feeding empty boxes to said member, and mechanism for feeding covers to the packed boxes.

39. In an automatic packing machine, the combination of a rotatable assembling dial having pockets or openings to receive the boxes for packing, means for feeding the boxes to said dial at a point in vertical alinement with one or another of said openings, a plug arranged beneath said dial in vertical alinement with said feeding point, means for elevating said plug through the alined opening to the surface of the dial just before said feeding means reaches the limit of its feeding movement, whereby the box rests on said plug, the latter being yieldably held in its elevated position, a vertically movable plunger arranged over said dial in axial alinement with said plug to force the box and plug downwardly until the box is within the opening on the dial, mechanism for feeding the material to the empty boxes on the dial, and mechanism for feeding covers to the packed boxes.

40. In an automatic packing machine, the combination of a rotatable assembling dial having pockets or openings to receive the boxes for packing, means for feeding the boxes to said dial at a point in vertical alinement with one or another of said openings, a stationary plate beneath said dial to support the boxes in said openings as the dial is operated, said plate having an opening in vertical alinement with said feeding point, a plug arranged beneath said dial in line with the opening in said plate, means for elevating said plug through the alined openings in said plate and dial just before said feeding means reaches the limit of its feeding movement, whereby the box rests on said plug, said elevating means including a spring which yieldably holds the plug in elevated position, means for lowering said plug to bring the box within the opening on said dial, mechanism for feeding the material to the empty boxes on the dial, and mechanism for feeding covers to the packed boxes.

41. In an automatic packing machine, the combination of a rotatable assembling dial having pockets or openings to receive the boxes for packing, means for feeding the boxes to said dial at a point in vertical alinement with one or another of said disks, a yieldable support arranged to project upwardly through the opening at the feeding point to support the fed box, means for lowering said support to bring the box within the opening, mechanism for feeding the material to the empty boxes on the dial, and mechanism for feeding covers to the packed boxes.

42. In an automatic packing machine, the combination of a rotatable assembling dial having pockets or openings to receive the boxes for packing, means for feeding the boxes to said dial at a point in vertical alinement with one or another of said openings, a yieldable support arranged to project upwardly through said opening at the feed point to support the fed box, a plunger arranged to force the box and plug downwardly until the box is within the opening on the dial, mechanism for feeding the material to the empty boxes on the dial, and mechanism for feeding covers to the packed boxes.

43. In an automatic packing machine, a shaft mounted for vertical reciprocation, a hollow crank-block secured to the lower end of said shaft and provided with a vertical opening at each end, a horizontal guide way in said block, a driving shaft extending into said openings and having a crank pin engaging said guide way, whereby the continuous rotation of said driving shaft causes vertical reciprocation of said crank-block and connected shaft, plunger mechanism carried at the upper end of said shaft, an assembling device associated with said plunger mechanism, means for feeding the boxes to said assembling device, and means for feeding covers to the boxes on said device.

44. In an automatic packing machine, an upright and substantially rectangular supporting framework, a horizontally rotatable assembling dial mounted centrally on top of said framework, a horizontally rotatable box-feeding disk mounted adjacent to said dial on one side thereof for feeding the boxes directly to said dial, a horizontally rotatable cover-feeding disk mounted adjacent to said dial on the opposite side thereof for feeding the covers directly to the boxes on said dial a horizontal driving shaft mounted in said framework at the bottom thereof and extending in the direction of the length of said framework, and a vertical operating shaft extending from said driving shaft to each of said disks and to said dial.

45. In an automatic packing machine, the combination of a rotatable assembling dial having a central opening, a vertical shaft projecting through said opening and provided at its upper end with plunger mechanism, a guide sleeve for said shaft, a hollow crank block secured to the lower end of said shaft and provided with a vertical opening at each end, a driving shaft extending into said openings and having a crank pin within said block, a transverse chamber formed in said block to receive said crank pin, whereby the continuous rotation of said driving shaft causes vertical reciprocation of said block and the connected plunger shaft, mechanism for feeding the empty boxes to said dial, mechanism for feeding the material to the empty boxes on said dial, and mechanism for feeding the covers to the packed boxes.

46. In an automatic packing machine, the combination of a rotatable assembling dial having a central opening, a vertical shaft projecting through said opening and provided at its upper end with plunger mechanism, a guide sleeve for said shaft, a hollow crank block secured to the lower end of said shaft and provided with a vertical opening at each end, a driving shaft extending into said openings and having a crank pin within said block, a guide head rotatably mounted on said crank pin adapted to slide in said chamber, whereby the continuous rotation of said driving shaft causes vertical reciprocation of said block and the connected plunger shaft, mechanism for feeding the empty boxes to said dial, mechanism for feeding the material to the empty boxes on said dial, and mechanism for feeding the covers to the packed boxes.

47. In an automatic packing machine having a bed or framework, the combination of an intermittently rotatable dial mounted at the top of said framework for receiving the boxes to be packed, a continuously rotatable feeding disk mounted adjacent to said dial, an intermittently-operable arm for conveying the boxes one by one from said disk to the dial, a common driving shaft journaled in the lower portion of said framework, operative connections leading from said shaft to said dial, said disk and said arm, mechanism for feeding the material to the empty boxes on said dial, and mechanism for feeding the covers to the packed boxes.

48. In an automatic packing machine, a feeding mechanism including a pair of concentrically mounted disks adapted to rotate continuously in opposite directions, one of said disks being of greater diameter than the other, so that the articles placed on the smaller or inner disk are centrifugally thrown to the larger or outer disk, and intermittently actuated means for removing the articles from said outer disk.

49. In an automatic packing machine, a feeding mechanism including a pair of concentrically mounted disks adapted to rotate continuously in opposite directions, one of said disks being of greater diameter than the other, so that the articles placed on the smaller or inner disk are centrifugally thrown on to the larger or outer disk, a vertical driving shaft arranged in the axis of revolution of said disks, means for connecting said disks reversely with said shaft to cause simultaneous rotation of said disk in opposite directions, and intermittently actuated means for removing the articles from said outer disk.

50. In an automatic packing machine having a bed or framework, the combination with an intermittently operated assembling dial mounted centrally at the top of said framework, of a vertically reciprocable shaft extending through the center of said dial and carrying plunger mechanism at its upper end, a continuously rotatable box-feeding disk at one side of said dial, a continuously rotatable cover-feeding disk at the opposite side of said dial, said disks being arranged to rotate in substantially the same plane as the dial, an intermittently actuated member associated with each disk for conveying the articles to the assembling dial, a vertical shaft for supporting each of said disks, material-feeding mechanism supported at one side of said framework substantially midway between said disks and adapted to be intermittently operated, a common driving shaft journaled in the lower portion of said framework, and operative connections leading from the driving shaft to the aforesaid movable parts.

51. In an automatic packing machine having a bed or framework, the combination with an intermittently operated assembling dial mounted centrally at the top of said framework, of a vertically reciprocable shaft extending through the center of said dial and carrying plunger mechanism at its upper end, a continuously rotatable box-feeding disk at one side of said dial, a continuously rotatable cover-feeding disk at the opposite side of said dial, said disks being arranged to rotate in substantially the same plane as the dial, an intermittently actuated member associated with each disk for conveying the articles to the assembling dial, a vertical shaft for supporting each of said disks, material-feeding mechanism supported at one side of said framework substantially midway between said disks and adapted to be intermittently operated, banding mechanism supported at the opposite side of said framework and adapted to affix a band of paper or the like to the sealed boxes as they leave the dial, a common driving shaft journaled in the lower portion of said framework, and operative connections leading from the driving shaft to the aforesaid movable parts.

52. In an automatic packing machine having a bed or framework, the combination of an assembling dial rotatably mounted at the top of said framework, an operating wheel connected with said dial, a vertical shaft adapted to be continuously rotated, a box-feeding disk mounted on the upper end of said shaft, a vertical counter-shaft geared to said disk-supporting shaft, a crank arm at the lower end of said counter-shaft to actuate said wheel intermittently, mechanism for feeding the material to the empty boxes on said dial, and mechanism for feeding the covers to the packed boxes.

53. In an automatic packing machine having a bed or framework, the combination of an assembling dial rotatably mounted at the top of said framework, a vertical shaft adapted to be continuously rotated, a box-feeding-disk mounted on the upper end of said shaft, a gear fixed upon said vertical shaft, operative connections between said gear and said dial whereby the latter is intermittently rotated during the continuous rotation of said gear, mechanism for feeding the material to the empty boxes on the dial, and mechanism for feeding the covers to the packed boxes.

54. In an automatic packing machine, the combination of a rotatable feeding-disk having a central opening or recess, a separating-disk mounted to rotate in said recess substantially in the same plane as the feeding-disk, a vertical shaft on which said disks are supported, said feeding-disks being rigidly connected to said shaft while said supporting-disk is rotatably mounted thereon, a gear fixed concentrically to said supporting-disk beneath the same, an annular rack fixed concentrically below said feeding-disk, a stub shaft journaled in said feeding-disk, and a gear secured to each end of said stub shaft, the upper stub shaft gear being in mesh with the gear on the supporting-disk, while the lower stub shaft gear is in mesh with said annular rack, whereby said disks are rotated in opposite directions.

55. In an automatic packing machine, the combination with an intermittently rotatable assembling dial adapted to receive the boxes for packing, of a vertical shaft, a pivoted arm mounted on said shaft for conveying the boxes to said dial, a slidable member for conveying to said dial the material to be packed into the boxes, an operative connection between said member and said shaft for simultaneously moving said member and said arm into feeding position, means for intermittently rocking said shaft, and mechanism for feeding the covers to the packed boxes.

56. In an automatic packing machine, the combination with an intermittently rotatable assembling dial adapted to receive the boxes for packing, of a vertical shaft, a pivoted arm mounted on said shaft for conveying the boxes to said dial, a slidable member for conveying to said dial the material to be packed into the boxes, a rotatable vertical tube having a lateral extension at its upper end to feed suitable blanks into position over the dial, operative connections leading from said shaft to said slidable member and said tube, whereby said three feeding members are simultaneously moved into feeding position over the dial when the shaft is operated, means for intermittently rocking said shaft, and mechanism for feeding covers to the packed boxes.

57. In an automatic packing machine, the combination of a rotatable assembling dial adapted to receive the boxes for packing, rotary mechanism at one side of said dial for horizontally feeding empty boxes to the same, rotary mechanism for horizontally feeding the material to the empty boxes on said dial, mechanism on the opposite side of said dial for feeding the covers to the packed boxes, means for forcing said covers in place on the boxes, and driving connections for simultaneously actuating all of said mechanisms into feeding position.

58. In an automatic packing machine, the combination of a rotatable assembling dial adapted to receive the boxes for packing, a rotatable box-feeding disk at one side of said dial, a rotatable cover-feeding disk at the opposite side of said dial, a pivoted arm associated with each of said disks and adapted to move the boxes or covers from the disk to the dial, mechanism for feeding the material to the empty boxes on said dial, plunger means for placing the covers on the packed boxes, and driving connections for simultaneously actuating said arms and said mechanisms into feeding position.

59. In an automatic packing machine, the combination with a feeding disk, a separating disk mounted concentrically with said feeding-disk, means for rotating said disks in opposite directions, whereby the articles are thrown centrifugally from the separating-disk to the feeding-disk, of an intermittently actuated arm for removing the articles from said feeding-disk one by one, said arm forming a stop for the articles in its normal as well as in its actuated position.

60. In an automatic packing machine, the combination of an intermittently rotatable assembling dial, a continuously rotatable feeding disk, an intermittently operable device for conveying the articles one by one from said feeding disk to said dial, a vertical driving shaft on which said disk is rigidly mounted, a crank arm geared to said shaft, and means for intermittently connecting said crank arm operatively with said dial.

61. In an automatic packing machine, the combination of a vertical driving shaft, a pair of disks supported thereon, so that their operating surfaces lie in substantially the same plane, and connections between said shaft and said disks for rotating said disks in opposite directions at substantially the same speed.

62. In an automatic packing machine, the combination with an intermittently rotatable assembling dial, of box-feeding mechanism and cover-feeding mechanism associated with said dial, each of said mechanisms including a pair of concentric disks adapted to rotate in opposite directions, the operating surfaces of said disks lying in substantially the same plane, whereby the articles are thrown by centrifugal force from the inner to the outer disk, said feeding-mechanisms also including each a device for conveying the articles from the outer disk to the assembling dial.

63. In an automatic packing machine, the combination of an intermittently rotatable assembling dial, a vertical shaft on which said dial is mounted, a pair of concentric feeding disks at each side of said dial, a vertical driving shaft on which each pair of said disks is mounted for continuous rotation in opposite directions, the upper or operating surfaces of each pair of disks lying in substantially the same plane, so that the articles are thrown from the inner to the outer disk by centrifugal force, and connections between said dial-supporting shaft and one of said disk-supporting shafts whereby the rotation of the latter is intermittently communicated to the former.

64. In an automatic packing machine, feeding mechanism comprising an inner disk, an outer disk surrounding the same, means for rotating said disks in opposite directions, whereby the articles are centrifugally thrown from said inner disk to said outer disk, and means for removing the articles from the outer disk.

65. In an automatic packing machine, feeding mechanism comprising an inner disk, an outer disk surrounding the same, means for continuously rotating said disks in opposite directions, whereby the articles are centrifugally thrown from said inner disk to said outer disk, and intermittently actuated means for removing the articles one by one from the outer disk.

66. In an automatic packing machine, the combination with an intermittently rotatable assembling dial, of box-feeding mechanism and cover-feeding mechanism associated with said dial, each of said mechanisms including a pair of concentric disks adapted to rotate in opposite directions, the operating surfaces of said disks lying in substantially the same plane, whereby the articles are thrown by centrifugal force from the inner to the outer disk, said feeding-mechanisms also including each a device for conveying the articles from the outer disk to the assembling dial, means for continuously rotating said disks, and driving connections for intermittently actuating said conveying devices simultaneously.

67. In an automatic packing machine, the combination of an intermittently rotatable assembling dial on which the boxes are packed, said dial being provided with openings or pockets for holding the boxes, a reciprocable banding slide having an opening adapted to be brought into alinement with the openings in said dial, means for feeding a continuous band of paper from a roll across the opening in said slide, a device for automatically cutting said continuous band of paper into strips of proper length, and a plunger operable during the stationary intervals of said dial for pushing the packed boxes through the dial openings into the alined slide opening, whereby the paper band is automatically applied across the bottom and up the sides of the box.

68. In an automatic packing machine, the combination of an intermittently rotatable assembling dial on which the boxes are packed, said dial being provided with openings or pockets for holding the boxes, a reciprocable banding slide having an opening adapted to be brought into alinement with the openings in said dial, means for feeding a continuous band of paper from a roll across the opening in said slide, a device for automatically cutting said continuous band of paper into strips of proper length, means for applying a suitable adhesive to the ends of the cut strip, and a plunger operable during the stationary intervals of said dial for pushing the packed boxes through the dial openings into the alined slide opening, whereby the cut strip is automatically applied across the bottom and up the sides of the box.

69. In an automatic packing machine, the combination of an intermittently rotatable assembling dial on which the boxes are packed, said dial being provided with openings or pockets for holding the boxes, a reciprocable banding slide having an opening adapted to be brought into alinement with the openings in said dial, means for feeding a continuous band of paper from a roll across the opening in said slide, a device for automatically cutting said continuous band of paper into strips of proper length, a plunger operable during the stationary intervals of said dial for pushing the packed boxes through the dial openings into the alined slide opening, whereby the cut strip is automatically applied across the bottom and up the sides of the box, and yieldable means in the slide opening for pressing the side portions of the applied strip against the box.

70. In an automatic packing machine, the combination of an intermittently rotatable assembling dial on which the boxes are packed, said dial being provided with openings or pockets for holding the boxes, a reciprocable banding slide having an opening adapted to be brought into alinement with the openings in said dial, means for feeding a continuous band of paper from a roll across the opening in said slide, a device for automatically cutting said continuous band of paper into strips of proper length, a plunger operable during the stationary intervals of said dial for pushing the packed boxes through the dial openings into the alined slide opening, whereby the cut strip is automatically applied across the bottom and up the sides of the box, and yieldable means for holding the strip taut as it bends around the box.

71. In an automatic packing machine, the combination of an intermittently rotatable assembling dial on which the boxes are packed, said dial being provided with openings or pockets for holding the boxes, a reciprocable banding slide having an opening adapted to be brought into alinement with the openings in said dial, means for feeding a band of paper across the opening in said slide, pneumatic means for holding the band in position across said opening, and a plunger operable during the stationary intervals of said dial for pushing the packed boxes through the dial openings into the alined slide opening, whereby the paper band is automatically applied across the bottom and up the sides of the box.

72. In an automatic packing machine, the combination of an intermittently rotatable assembling dial on which the boxes are packed, said dial being provided with openings or pockets for holding the boxes, a reciprocable banding slide having an opening adapted to be brought into alinement with the openings in said dial, means for feeding a band of paper across the opening in said slide, pneumatic means for holding the band in position across said opening, means for applying a suitable adhesive to the ends of said band while held in position by said pneumatic means, and a plunger operable during the stationary intervals of said dial for pushing the packed boxes through the dial openings into the alined slide opening, whereby the paper band is automatically applied across the bottom and up the sides of the box.

73. In an automatic packing machine, the combination of mechanism for automatically filling empty boxes and placing covers on the filled boxes, said mechanism including an intermittently movable member having openings or pockets for holding the filled and covered boxes, a reciprocable banding slide having an opening adapted to be brought into alinement with the openings in said member, means for feeding a continuous band of paper from a roll across the opening in said slide, a device for automatically cutting said band of paper into strips of proper length, and a plunger operable during the stationary intervals of said member for pushing the packed boxes through the openings in said member into the alined slide opening, whereby the strip is automatically applied across the bottom and up the sides of the box.

74. In an automatic packing machine, the combination of mechanism for automatically filling empty boxes and placing covers on the filled boxes, said mechanism including an intermittently movable member on which the boxes are filled and covered, means for discharging the filled and covered boxes from said member, and automatic banding mechanism associated with said member to affix a band to each of the filled and covered boxes as they are discharged from said member.

In witness whereof, I hereunto subscribe my name this 26th day of June, A. D. 1912.

CHARLES F. SMITH.

Witnesses:
G. W. NUTTING,
C. W. CAMPBELL.